US012795120B2

(12) United States Patent
Wang

(10) Patent No.: US 12,795,120 B2
(45) **Date of Patent: *Nov. 10, 2026**

(54) FILTERING DIFFERENTLY CODED FRAMES BY A GENERAL FILTERING MODEL BASED ON DEEP LEARNING

(71) Applicant: Tencent Technology (Shenzhen) Company Limited, Shenzhen (CN)

(72) Inventor: Liqiang Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/262,746

(22) Filed: Jul. 8, 2025

(65) Prior Publication Data

US 2025/0337927 A1 Oct. 30, 2025

Related U.S. Application Data

(63) Continuation of application No. 18/516,276, filed on Nov. 21, 2023, now Pat. No. 12,368,866, which is a (Continued)

(30) Foreign Application Priority Data

Feb. 10, 2022 (CN) ........................ 202210126411.X

(51) Int. Cl.
*H04N 7/12* (2006.01)
*H04N 19/117* (2014.01)
(Continued)

(52) U.S. Cl.
CPC ......... *H04N 19/174* (2014.11); *H04N 19/117* (2014.11); *H04N 19/159* (2014.11)

(58) Field of Classification Search
CPC .................................................... H04N 19/174
See application file for complete search history.

(56) References Cited

U.S. PATENT DOCUMENTS 12,652,402 B2 * 6/2026 Panusopone ......... H04N 19/197
2007/0160129 A1 7/2007 Fujisawa et al.
(Continued)

FOREIGN PATENT DOCUMENTS

CN 110351568 A 10/2019
CN 113259671 A 8/2021
(Continued)

OTHER PUBLICATIONS

Extended European Search Report and Search Opinion received for European Application No. 22925716.7, mailed on Apr. 4, 2025, 11 pages.
(Continued)

*Primary Examiner* — Young Lee
(74) *Attorney, Agent, or Firm* — ARENTFOX SCHIFF LLP

(57) ABSTRACT

In a picture filtering method, encoding modes corresponding to a plurality of picture areas in a picture are obtained. Encoding information of the picture is decoded. The encoding information includes classification information that is determined based on at least the encoding modes corresponding to the plurality of picture areas in the picture. The picture and the classification information are input into a general filtering model trained using deep learning. A filtered picture is obtained based on the general filtering model performing filtering on the picture based on the encoding information. The classification information includes at least one of first classification information and second classification information. The first classification information indicates a first encoding mode corresponding to one or more pixels in the picture. The second classification information
(Continued)

indicates a second encoding mode corresponding to a preset size area in the picture.

19 Claims, 7 Drawing Sheets

Related U.S. Application Data continuation of application No. PCT/CN2022/137882, filed on Dec. 9, 2022.

(51) Int. Cl.
*H04N 19/159* (2014.01)
*H04N 19/174* (2014.01)

(56) References Cited

U.S. PATENT DOCUMENTS

| | | | | |
|---|---|---|---|---|
| 2020/0213587 | A1 | 7/2020 | Galpin et al. | |
| 2021/0136367 | A9 | 5/2021 | Na | |
| 2026/0164019 | A1* | 6/2026 | Kim | H04N 19/174 |
| 2026/0164020 | A1* | 6/2026 | Kim | H04N 19/174 |

FOREIGN PATENT DOCUMENTS

| | | | |
|---|---|---|---|
| CN | 113766249 | A | 12/2021 |
| WO | 2019/031410 | A1 | 2/2019 |
| WO | 2021/244884 | A1 | 12/2021 |

OTHER PUBLICATIONS

International Search Report and Written Opinion received for PCT Patent Application No. PCT/CN2022/137882, mailed on Mar. 2, 2023, 11 pages (5 pages of English Translation and 6 pages of Original Document).
Office Action received for Japanese Patent Application No. 2024-516555, mailed on Feb. 18, 2025, 12 pages (7 pages of English Translation and 5 pages of Original Document).
Partial Supplementary European Search Report and Search Opinion received for European Application No. 22925716.7, mailed on Jan. 27, 2025, 15 pages.

* cited by examiner

FILTERING DIFFERENTLY CODED FRAMES BY A GENERAL FILTERING MODEL BASED ON DEEP LEARNING

RELATED APPLICATIONS

The present application is a continuation of U.S. application Ser. No. 18/516,276, filed on Nov. 21, 2023, which is a continuation of International Application No. PCT/CN2022/137882, filed on Dec. 9, 2022, which claims priority to Chinese Patent Application No. 202210126411.X filed on Feb. 10, 2022. The disclosures of the prior applications are hereby incorporated by reference in their entirety.

FIELD OF THE TECHNOLOGY

Embodiments of this application relate to the field of picture processing technologies, including a picture filtering method and apparatus, a device, a storage medium, and a program product.

BACKGROUND OF THE DISCLOSURE

In related technologies, a loop filter includes a deblocking filter (DBF), a sample adaptive offset (SAO), and an adaptive loop filter (ALF), which mainly aims to perform filtering on a reconstructed picture, to reduce a blocking effect, a ringing effect, and the like, thereby improving quality of the reconstructed picture. In an ideal case, the reconstructed picture is restored to an original picture through the filter. Because many filter coefficients of the filter in the related technologies are manually designed, there is a large room for optimization. In view of excellent performance of a deep learning tool in picture processing, a loop filter based on deep learning is applied in a loop filter module. However, the loop filter based on deep learning in the related technologies still has a defect in performance optimization, and performance of the filter needs to be further improved.

SUMMARY

Embodiments of this disclosure provide a picture filtering method and apparatus, a device, a storage medium, and a program product, to reduce the cost of model parameter storage while improving a picture filtering effect.

In an embodiment, a picture filtering method includes determining encoding information of a picture, the encoding information comprising classification information indicating one of an intra encoding mode or an inter encoding mode of the picture. The method further includes inputting the picture and the classification information indicating one of the intra encoding mode or the inter encoding mode into a general filtering model trained using deep learning, and obtaining a filtered picture based on the filtering model performing filtering on the picture based on the encoding information.

In an embodiment, a picture filtering apparatus includes processing circuitry configured to determine encoding information of a picture, the encoding information comprising classification information indicating one of an intra encoding mode or an inter encoding mode of the picture. The processing circuitry is further configured to input the picture and the classification information indicating one of the intra encoding mode or the inter encoding mode into a general filtering model trained using deep learning, and obtain a filtered picture based on the filtering model performing filtering on the picture based on the encoding information.

The filtering model in this embodiment of this disclosure may perform filtering on the to-be-filtered picture in the intra-frame encoding mode, and may also perform filtering on the to-be-filtered picture in the inter-frame encoding mode. This is equivalent to a general filtering model of the to-be-filtered pictures in different modes. Compared with building corresponding filtering models for different modes, in the filtering model in this embodiment of this disclosure, a storage space occupied by model parameters is significantly reduced, and the cost of model parameter storage is low; and the classification information is combined through the filtering model with, and differential filtering is performed on the to-be-filtered picture, which may be applied to to-be-filtered pictures in different modes, thereby improving a filtering effect of the to-be-filtered picture.

BRIEF DESCRIPTION OF THE DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings.

DESCRIPTION OF EMBODIMENTS

Figure 1:
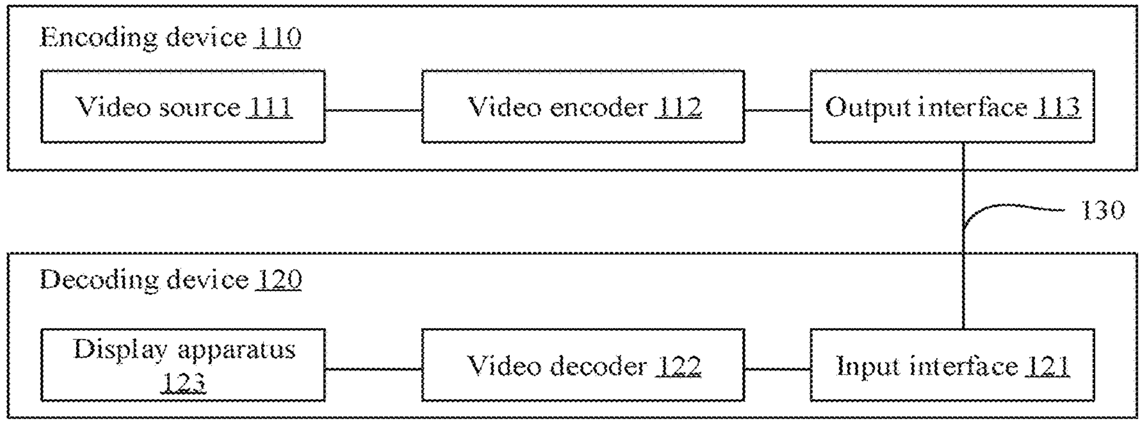
FIG. 1 is a schematic block diagram of a video encoding and decoding system involved in an embodiment of this disclosure.

The following clearly and completely describes the technical solutions in the embodiments of the present disclosure with reference to the accompanying drawings in the embodiments of the present disclosure. The described embodiments are some of the embodiments of the present disclosure rather than all of the embodiments. All other embodiments obtained by a person of ordinary skill in the art based on the embodiments of the present disclosure shall fall within the protection scope of the present disclosure.

The terms such as “first” and “second” in this specification, the claims, and the foregoing accompanying drawings of the present disclosure are intended to distinguish between similar objects rather than describe a particular sequence or a chronological order. It is to be understood that data used in this way is exchangeable in a proper case, so that the embodiments of the present disclosure described herein can be implemented in an order different from the order shown or described herein. Moreover, the terms “include”, “contain” and any other variants mean to cover the non-exclusive inclusion. For example, a process, method, system, product, or server that includes a list of steps or units is not necessarily limited to those steps or units, but may include other steps or units not expressly listed or inherent to such a process, method, product, or device.

“And/or” described below refers to “at least one”, such as A and/or B, which represents at least one of A and B.

For ease of understanding of embodiments of the embodiments of this disclosure, first, the related concepts involved in the embodiments of this disclosure are briefly described below.

Artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result. In other words, the AI is a comprehensive technology of computer sciences, attempts to understand essence of intelligence, and produces a new intelligent machine that can react in a manner similar to human intelligence. The AI is to study the design principles and implementation methods of various intelligent machines, to enable the machines to have the functions of perception, reasoning, and decision-making.

The AI technology is a comprehensive discipline, covering a wide range of fields including both a hardware-level technology and a software-level technology. The basic AI technology generally includes a technology such as a sensor, a dedicated AI chip, cloud computing, distributed storage, a big data processing technology, an operation/interaction system, or mechatronics. An AI software technology mainly includes fields such as a computer vision technology, a voice processing technology, a natural language processing technology, and machine learning/deep learning.

Machine learning (ML) is a multi-field interdisciplinary subject involving the probability theory, statistics, the approximation theory, convex analysis, the algorithm complexity theory, and the like. The machine learning specializes in studying how a computer simulates or implements a human learning behavior to obtain new knowledge or skills, and reorganize an existing knowledge structure, so as to keep improving its performance. The machine learning is a core of the AI, is a basic way to make the computer intelligent, and is applied to various fields of the AI. The machine learning and deep learning generally include technologies such as an artificial neural network, a belief network, reinforcement learning, transfer learning, inductive learning, and learning from demonstrations.

This embodiment of this disclosure may be applied to a picture encoding and decoding field, a video encoding and decoding field, a hardware video encoding and decoding field, a dedicated circuit video encoding and decoding field, a real-time video encoding and decoding field, and the like. For example, a solution in this embodiment of this disclosure may be combined with an audio video coding standard (AVS), such as, an H.264/audio video coding (AVC) standard, an H.265/high efficiency video coding (HEVC) standard, and an H.266/versatile video coding (VVC) standard. The solution in this embodiment of this disclosure may be combined with other proprietary or industry standards for operation. The standards include ITU-TH.261, ISO/IECMPEG-1 Visual, ITU-TH.262 or ISO/IECMPEG-2 Visual, ITU-TH.263, ISO/IECMPEG-4 Visual, and ITU-TH.264 (also referred to as ISO/IEC MPEG-4AVC), including scalable video coding (SVC) and multiview video coding (MVC) extensions. It should be understood that a technology in this embodiment of this disclosure is not limited to any specific encoding and decoding standards or technologies.

For ease of understanding, a video encoding and decoding system involved in this embodiment of this disclosure is first introduced with reference to FIG. 1.

FIG. 1 is a schematic block diagram of a video encoding and decoding system involved in an embodiment of this disclosure. FIG. 1 is only an example, and the video encoding and decoding system in this embodiment of this disclosure includes but is not limited to what is shown in FIG. 1. As shown in FIG. 1, the video encoding and decoding system 100 includes an encoding device 110 and a decoding device 120. The encoding device is configured to encode (which may be understood as compressing) video data to generate a bitstream and transmit the bitstream to the decoding device. The decoding device decodes the bitstream generated by the encoding device, to obtain decoded video data.

The encoding device 110 in this embodiment of this disclosure may be understood as a device with a video encoding function, and the decoding device 120 may be understood as a device with a video decoding function. In other words, this embodiment of this disclosure includes a wider range of apparatuses for the encoding device 110 and the decoding device 120, for example, including a smartphone, a desktop computer, a mobile computing apparatus, a notebook (for example, laptop) computer, a tablet computer, a set-top box, a television, a camera, a display apparatus, a digital media player, a video game console, a vehicle-mounted computer, and the like.

In some embodiments, the encoding device 110 may transmit the encoded video data (for example, the bitstream) to the decoding device 120 via a channel 130. The channel 130 may include one or more media and/or apparatuses capable of transmitting the encoded video data from the encoding device 110 to the decoding device 120.

In an embodiment, the channel 130 includes one or more communication media that enables the encoding device 110 to directly transmit the encoded video data to the decoding device 120 in real time. In this embodiment, the encoding device 110 may modulate the encoded video data according to a communication standard and transmit the modulated video data to the decoding device 120. The communication media includes wireless communication media, such as a radio frequency spectrum. In some embodiments, the communication medium may further include wired communication media, such as one or more physical transmission lines.

In another embodiment, the channel 130 includes a computer-readable storage medium. The computer-readable storage medium may store the video data encoded by the encoding device 110. The computer-readable storage media include a plurality of locally accessible data storage media, such as an optical disk, a DVD, a flash memory, and the like. In this embodiment, the decoding device 120 may obtain the encoded video data from the computer-readable storage medium.

In another embodiment, the channel 130 may include a storage server. The storage server may store the video data encoded by the encoding device 110. In this embodiment, the decoding device 120 may download the stored encoded video data from the storage server. In some embodiments, the storage server may store the encoded video data and may transmit the encoded video data to the decoding device 120, such as a web server (for example, used for a website), a file transfer protocol (FTP) server, and the like.

In some embodiments, the encoding device 110 includes a video encoder 112 and an output interface 113. The output interface 113 may include a modulator/demodulator (modem) and/or a transmitter.

In some embodiments, the encoding device 110 may further include a video source 111 in addition to the video encoder 112 and the output interface 113.

The video source 111 may include at least one of a video collection apparatus (for example, a video camera), a video archive, a video input interface, and a computer graphics system, where the video input interface is configured to receive video data from a video content provider, and the computer graphics system is configured to generate video data.

The video encoder 112 encodes the video data from the video source 111, to generate a bitstream. The video data may include one or more pictures or a sequence of pictures. The bitstream includes encoding information of the pictures or the sequence of pictures in the form of the bitstream. The encoding information may include encoding picture data and associated data. The associated data may include a sequence parameter set (SPS), a picture parameter set (PPS), and other syntax structures. The SPS may include parameters that are applied to one or more sequences. The PPS may include parameters that are applied to one or more pictures. The syntax structure refers to a set of zero or more syntax elements arranged in a specified order in the bitstream.

The video encoder 112 directly transmits the encoded video data to the decoding device 120 via the output interface 113. The encoded video data may be further stored on a storage medium or a storage server for subsequent reading by the decoding device 120.

In some embodiments, the decoding device 120 includes an input interface 121 and a video decoder 122.

In some embodiments, the decoding device 120 may further include a display apparatus 123 in addition to the input interface 121 and the video decoder 122.

The input interface 121 includes a receiver and/or a modem. The input interface 121 may receive the encoded video data through the channel 130.

The video decoder 122 is configured to decode the encoded video data, to obtain the decoded video data, and transmit the decoded video data to the display apparatus 123.

The display apparatus 123 displays the decoded video data. The display apparatus 123 may be integrated with the decoding device 120 or external to the decoding device 120. The display apparatus 123 may include a plurality of display apparatuses such as a liquid crystal display (LCD), a plasma display, an organic light-emitting diode (OLED) display, or a display apparatus of another type.

In addition, FIG. 1 is only an example. The technical solution in this embodiment of this disclosure is not limited to FIG. 1. For example, the technology in this embodiment of this disclosure may be further applied to one-sided video encoding or one-sided video decoding.

The video encoding framework involved in this embodiment of this disclosure is introduced below.

Figure 2:
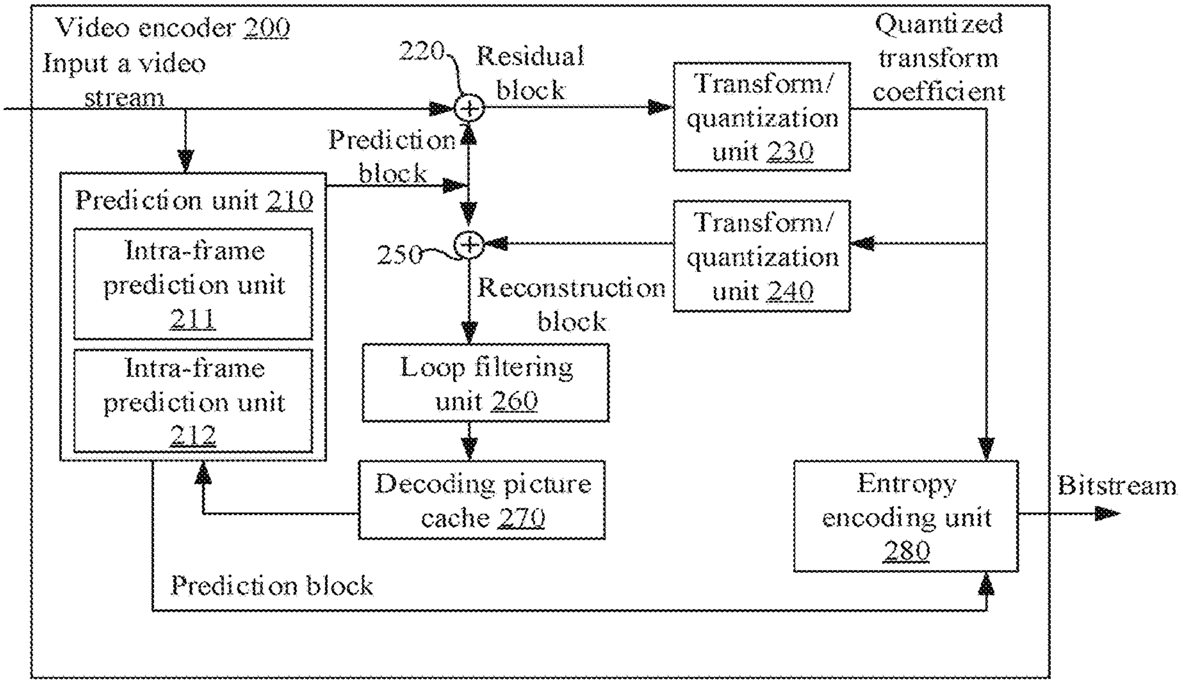
FIG. 2 is a schematic block diagram of a video encoder according to an embodiment of this disclosure.

FIG. 2 is a schematic block diagram of a video encoder according to an embodiment of this disclosure. It is to be understood that the video encoder 200 may be configured to perform lossy compression on a picture, and may also be configured to perform lossless compression on the picture. The lossless compression may be visually lossless compression or mathematically lossless compression.

The video encoder 200 may be applied to picture data in a luminance and chrominance (YCbCr, YUV) format.

For example, the video encoder 200 reads the video data, and for each frame of picture in the video data, divides a frame of picture into several coding tree units (CTU). In some examples, the CTB may be referred to as a "tree block", a "largest coding unit" (LCU), or a "coding tree block" (CTB). Each CTU may be associated with an equal-sized pixel block in the picture. Each pixel may correspond to one luminance (luminance or luma) sample and two chrominance (chrominance or chroma) samples. Therefore, each CTU may be associated with one luminance sample block and two chrominance sample blocks. A size of one CTU is, for example, 128×128, 64×64, 32×32, or the like. One CTU may be further divided into several coding units (CU) for coding, and the CU may be a rectangular block or a square block. The CU may be further divided into a prediction unit (PU) and a transform unit (TU), which enables coding, prediction, and transformation to be separated, making processing more flexible. In an example, the CTU is divided into CUs in a quadtree manner, and the CU is divided into a TU and a PU in a quadtree manner.

The video encoder and the video decoder may support various sizes of the PU. It is assumed that a size of a specific CU is 2N×2N, the video encoder and the video decoder may support the PU with a size of 2N×2N or N×N for intra-frame prediction, and may support 2N×2N, 2N×N, N×2N, N×N, or a symmetric PU with a similar size for inter-frame prediction. The video encoder and the video decoder may further support an asymmetric PU with a size of 2N×nU, 2N×nD, nL×2N, and nR×2N for inter-frame prediction.

In some embodiments, as shown in FIG. 2, the video encoder 200 may include: a prediction unit 210, a residual unit 220, a transform/quantization unit 230, an inverse transform/quantization unit 240, a reconstruction unit 250, a loop filtering unit 260, a decoding picture cache 270, and an entropy encoding unit 280. The video encoder 200 may include more, fewer, or different functional components.

In some embodiments, in this application, a current block may be referred to as a current coding unit (CU) or a current prediction unit (PU), and the like. A prediction block may also be referred to as a predicted picture block or a picture prediction block, and a reconstructed picture block may also be referred to as a reconstruction block or a picture reconstructed picture block.

In some embodiments, the prediction unit 210 includes an inter-frame prediction unit 211 and an intra-frame prediction unit 212. Because there is a strong correlation between adjacent pixels in one frame of a video, a method for intra-frame prediction is used in the video encoding and decoding technology to eliminate spatial redundancy between the adjacent pixels. Because there is a strong similarity between adjacent frames in the video, a method for inter-frame prediction is used in the video encoding and decoding technology to eliminate temporal redundancy between the adjacent frames, thereby improving encoding efficiency.

The inter-frame prediction unit 211 may be used for inter-frame prediction. The inter-frame prediction may refer to picture information of different frames. The inter-frame prediction finds a reference block from reference frames by using motion information and generates a prediction block based on the reference block, to eliminate the temporal redundancy; and the frame used in the inter-frame prediction may be a P frame and/or a B frame. The P frame refers to a forwarding prediction frame, and the B frame refers to a bidirectional prediction frame. The motion information includes a reference frame list in which the reference frame is located, a reference frame index, and a motion vector. The motion vector may be in whole pixels or sub-pixels. If the motion vector is in sub-pixels, interpolation filtering needs to be used in the reference frame to make a required sub-pixel block. A whole-pixel or sub-pixel block that is in the reference frame and that is found according to the motion vector is referred to as a reference block. In some technologies, the reference block is directly used as a prediction block, and in some technologies, reprocessing is performed to generate the prediction block based on the reference block. Reprocessing is performed to generate the prediction block based on the reference block, which may also be understood as using the reference block as the prediction block and then processing is performed to generate a new prediction block based on the prediction block.

The intra-frame prediction unit 212 only refers to information of the same frame of picture and predicts pixel information in a current encoding picture block, to eliminate the spatial redundancy. A frame used in the intra-frame prediction may be an I frame.

Intra-frame prediction modes used by HEVC include a planar mode, DC, and 33 angle modes. There are a total of 35 prediction modes. Intra-frame modes used by VVC include Planar, DC and 65 angle modes. There are a total of 67 prediction modes. Intra-frame modes used by AVS3 include DC, Plane, Bilinear, and 63 angle modes. There are a total of 66 prediction modes.

In some embodiments, the intra-frame prediction unit 212 may be implemented by using an intra block copy technology and an intra string copy technology.

The residual unit 220 may generate a residual block of the CU based on a pixel block of the CU and a prediction block of the PU of the CU. For example, the residual unit 220 may generate the residual block of the CU, so that each sample in the residual block has a value equal to a difference between a sample in the pixel block of the CU, and a corresponding sample in the prediction block of the PU of the CU.

A transform/quantization unit 230 may quantize a transform coefficient. A residual video signal undergoes transform operations such as DFT and DCT, to convert the signal into a transform domain, which is referred to as the transform coefficient. A lossy quantization operation is further performed on a signal in the transform domain, and a specific amount of information is lost, so that the quantized signal is beneficial to a compression expression. In some video coding standards, there may be more than one transform manner to be selected. Therefore, an encoder side also needs to select one of the transforms for the current coding CU and inform a decoder side. The degree of fineness of quantization is usually determined by the quantization parameter (QP). A greater value of the QP represents that coefficients within a greater range will be quantized as the same output, and therefore, may usually bring a greater distortion and lower bit rate; and conversely, a smaller value of the QP represents that coefficients within a smaller range will be quantized as a same output, and therefore, may usually bring a smaller distortion while corresponding to a higher bit rate.

An inverse transform/quantization unit 240 may respectively apply inverse quantization and inverse transform to the quantized transform coefficient, to reconstruct the residual block from the quantized transform coefficient.

A reconstruction unit 250 may add a sample of the reconstructed residual block to corresponding samples of one or more prediction blocks generated by the prediction unit 210, to generate a reconstructed picture block associated with the TU. By reconstructing a sample block of each TU of the CU in this manner, the video encoder 200 may reconstruct the pixel block of the CU.

A loop filtering unit 260 may perform a deblocking filtering operation to reduce block artifacts of pixel blocks associated with the CU. Compared with an original picture, the reconstructed picture is different from the original picture in some information due to the influence of quantization, that is, a distortion is generated. A filtering operation is performed on the reconstructed picture, for example, a filter such as DBF, SAO, or ALF, which may effectively reduce a distortion caused by quantization. Because these filtered reconstructed pictures are used as references for subsequent encoded pictures to predict future signals, the filtering operation is also referred to as the loop filtering, that is, a filtering operation in an encoding loop.

The decoding picture cache 270 may store a reconstructed pixel block. The inter-frame prediction unit 211 may perform inter-frame prediction on a PU of another picture by using a reference picture including the reconstructed pixel block. In addition, the intra-frame prediction unit 212 may perform intra-frame prediction on other PUs in the same picture as the CU by using the reconstructed pixel block in the decoding picture cache 270.

An entropy encoding unit 280 may receive the quantized transform coefficient from the transform/quantization unit 230. Statistical compression coding is performed on quantized transform domain signals according to frequencies of occurrence of values, and finally, a binarized (0 or 1) compressed bitstream is output. In addition, other information is generated during the encoding, such as the selected mode and motion vector, and the entropy encoding also needs to be performed to reduce the bit rate. Statistical encoding is a lossless encoding manner that can effectively reduce the bit rate required to express the same signal. Common calculation encoding manners include variable length coding (VLC) or content adaptive binary arithmetic coding (CABAC).

Figure 3:
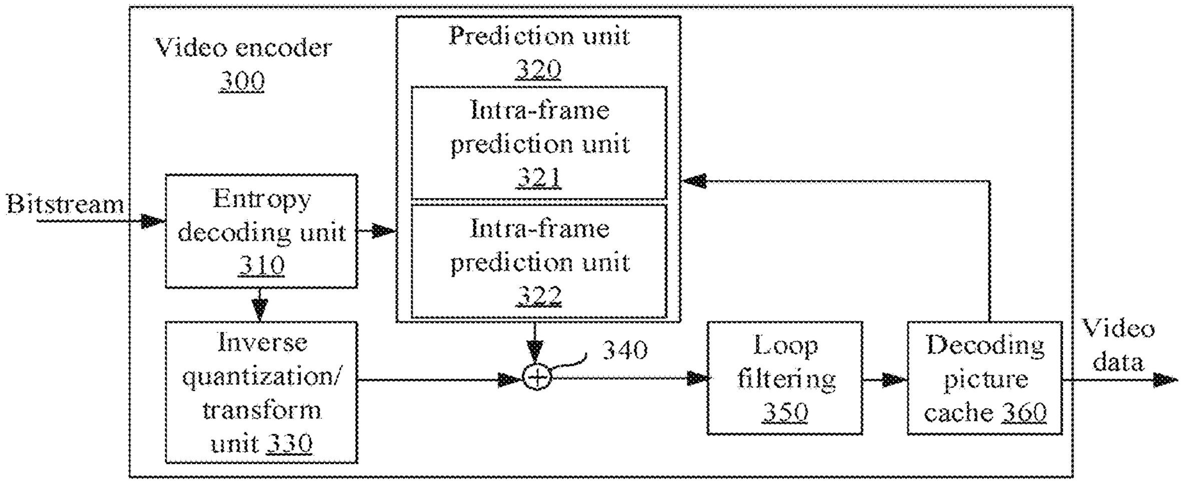
FIG. 3 is a schematic block diagram of a video decoder according to an embodiment of this disclosure.

FIG. 3 is a schematic block diagram of a video decoder according to an embodiment of this disclosure.

As shown in FIG. 3, the video decoder 300 includes an entropy decoding unit 310, a prediction unit 320, an inverse quantization/transform unit 330, a reconstruction unit 340, a loop filtering unit 350, and a decoding picture cache 360. The video decoder 300 may include more, fewer, or different functional components.

The video decoder 300 may receive a bitstream. The entropy decoding unit 310 may parse the bitstream to extract a syntax element from the bitstream. As a part of parsing the bitstream, the entropy decoding unit 310 may parse an entropy-encoded syntax element in the bitstream. The prediction unit 320, the inverse quantization/transform unit 330, the reconstruction unit 340, and the loop filtering unit 350 may decode video data according to the syntax element extracted from the bitstream, to be specific, generate the decoded video data.

In some embodiments, the prediction unit 320 includes an inter-frame prediction unit 321 and an intra-frame prediction unit 322.

The inter-frame prediction unit 321 may perform intra-frame prediction to generate a prediction block for the PU. The inter-frame prediction unit 321 may generate the prediction block for the PU based on a pixel block of a spatially neighboring PU by using an intra-frame prediction mode. The inter-frame prediction unit 321 may further determine the intra-frame prediction mode of the PU according to one or more syntax elements parsed from the bitstream.

The intra-frame prediction unit 322 may construct a first reference picture list (list 0) and a second reference picture list (list 1) according to the syntax elements parsed from the bitstream. Additionally, if the PU uses inter-frame prediction encoding, the entropy decoding unit 310 may parse motion information of the PU. The intra-frame prediction unit 322 may determine one or more reference blocks for the PU according to the motion information of the PU. The intra-frame prediction unit 322 may generate a prediction block for the PU according to one or more reference blocks for the PU.

The inverse quantization/transform unit 330 may inversely quantize (namely, dequantize) a transform coefficient associated with the TU. The inverse quantization/transform unit 330 may use a QP value associated with a CU of the TU to determine a degree of quantization.

After inverse quantizing the transform coefficient, the inverse quantization/transform unit 330 may apply one or more inverse transforms to the inverse quantization transform coefficient, to generate a residual block associated with the TU.

The reconstruction unit 340 reconstructs a pixel block of the CU by using the residual block associated with the TU of the CU and a prediction block of the PU of the CU. For example, the reconstruction unit 340 may add a sample of the residual block to a corresponding sample of the prediction block to reconstruct the pixel block of the CU, to obtain a reconstructed picture block.

A loop filtering unit 350 may perform a deblocking filtering operation to reduce block artifacts of pixel blocks associated with the CU.

The video decoder 300 may store a reconstructed picture of the CU in the decoding picture cache 360. The video decoder 300 may use the reconstructed picture in the decoding picture cache 360 as a reference picture for subsequent prediction, or transmit the reconstructed picture to a display apparatus for presentation.

A basic process of video encoding and decoding is as follows: at an encoder side, a frame of picture is divided into blocks, and for a current block, the prediction unit 210 generates a prediction block of the current block by using the intra-frame prediction or the inter-frame prediction. The residual unit 220 may calculate the residual block based on the prediction block and an original block of the current block, namely, a difference between the prediction block and the original block of the current block. The residual block may also be referred to as residual information. The residual block undergoes processes such as transform and quantization by the transform/quantization unit 230, which may remove information that is insensitive to human eyes, to eliminate visual redundancy. In some embodiments, the residual block before transform and quantization by the transform/quantization unit 230 may be referred to as a time domain residual block, and the time domain residual block after transform and quantization by the transform/quantization unit 230 may be referred to as a frequency residual block or a frequency domain residual block. The entropy encoding unit 280 receives the quantized change coefficient output from the transform quantization unit 230, and may perform entropy encoding on the quantized transform coefficient, to output a bitstream. For example, the entropy encoding unit 280 may eliminate character redundancy according to a target context model and probability information of a binary bitstream.

At a decoder side, the entropy decoding unit 310 may parse the bitstream to obtain prediction information, a quantization coefficient matrix, and the like of the current block, and the prediction unit 320 generates a prediction block of the current block based on the prediction information by using intra-frame prediction or inter-frame prediction for the current block. The inverse quantization/transform unit 330 performs inverse quantization and inverse transform on the quantization coefficient matrix by using the quantization coefficient matrix obtained from the bitstream to obtain a residual block. The reconstruction unit 340 adds the prediction block and the residual block to obtain a reconstruction block. The reconstruction block constitutes a reconstructed picture, and the loop filtering unit 350 performs loop filtering on the reconstructed picture based on a picture or based on a block, to obtain a decoded picture. The encoder side also needs similar operations as that of the decoder side to obtain the decoded picture. The decoded picture may also be referred to as the reconstructed picture, and the reconstructed picture may be a subsequent frame as a reference frame for inter-frame prediction.

Block division information determined by the encoder side and mode information or parameter information such as prediction, transform, quantization, entropy encoding, loop filtering, and the like, are carried in the bitstream when necessary. The decoder side determines mode information or parameter information such as block division information, prediction, transform, quantization, entropy encoding, loop filtering, and the like that is the same as that of the encoder side by parsing the bitstream and analyzing the existing information, to ensure that the decoded picture obtained by the encoder side is the same as the decoded picture obtained by the decoder side.

The foregoing is a basic procedure of a video codec under a block-based hybrid encoding framework. With the development of technology, some modules or steps of the framework or procedure may be optimized. This disclosure is applicable to the basic procedure of the video codec under the block-based hybrid encoding framework, but is not limited to the framework and procedure.

In some embodiments, this embodiment of this disclosure may be applied to various picture processing scenarios, including but not limited to a cloud technology, artificial intelligence, intelligent transportation, assisted driving, and the like.

The technical solution of the embodiments of this disclosure is described in detail below through some embodiments. The following embodiments may be mutually combined, and same or similar concepts or processes may not be repeatedly described in some embodiments.

Figure 4:
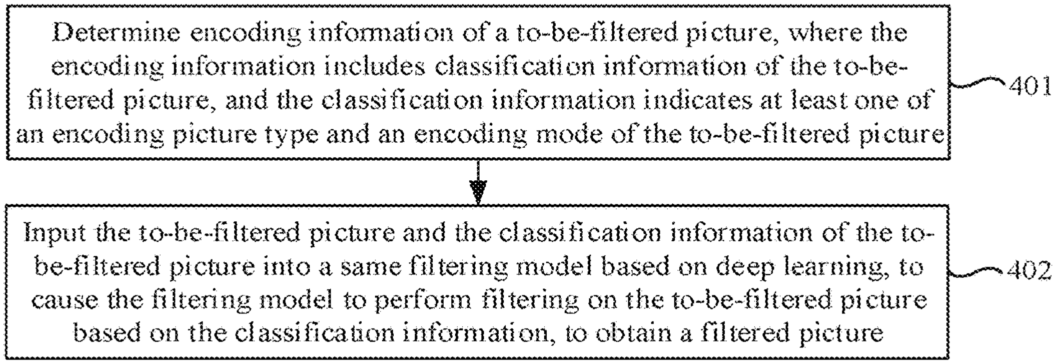
FIG. 4 is a flowchart of a picture filtering method according to an embodiment of this disclosure.

FIG. 4 is a flowchart of a picture filtering method according to an embodiment of this disclosure. As shown in FIG. 4, the method includes the following steps:

S401: Determine encoding information of a to-be-filtered picture, where the encoding information includes classification information of the to-be-filtered picture, and the classification information indicates at least one of an encoding picture type and an encoding mode of the to-be-filtered picture. For example, encoding information of a picture is determined. The encoding information includes classification information indicating at least one of an intra encoding mode or an inter encoding mode of the picture.

In some embodiments, this embodiment of this disclosure may be applied to both an encoder side and a decoder side. In other words, an execution subject in this embodiment of this disclosure may be the encoder in FIG. 1 and FIG. 2, or the decoder in FIG. 1 and FIG. 3.

In some embodiments, this embodiment of this disclosure may be further applied to other display devices. For example, the decoder sends the decoded reconstructed picture to the display device. The display device performs filtering on the reconstructed picture by using the picture filtering method in this embodiment of this disclosure, and displays the filtered picture.

In other words, the execution subject in this embodiment of this disclosure is an apparatus having a picture filtering function, such as a picture filtering apparatus. The picture filtering apparatus is an electronic device, or is a part of the electronic device, such as a processor in the electronic device. The electronic device may be an encoder, a decoder, a codec, a display device, and the like.

For ease of description, the method for this embodiment of this disclosure is described below. An example in which an execution subject is used as an electronic device is used.

The filter involved in this embodiment of this disclosure is a neural network filter, namely, a filtering model. In some embodiments, the filtering model is also referred to as a neural network in-loop filter (NNLF) based on a neural network.

The filtering model in this embodiment of this disclosure may not only implement filtering of the intra-frame encoding picture, but also may implement filtering of the inter-frame encoding picture. In other words, the filtering model in this embodiment of this disclosure is a universal filtering model, which may reduce the cost of storage of a model parameter.

Figure 5A:
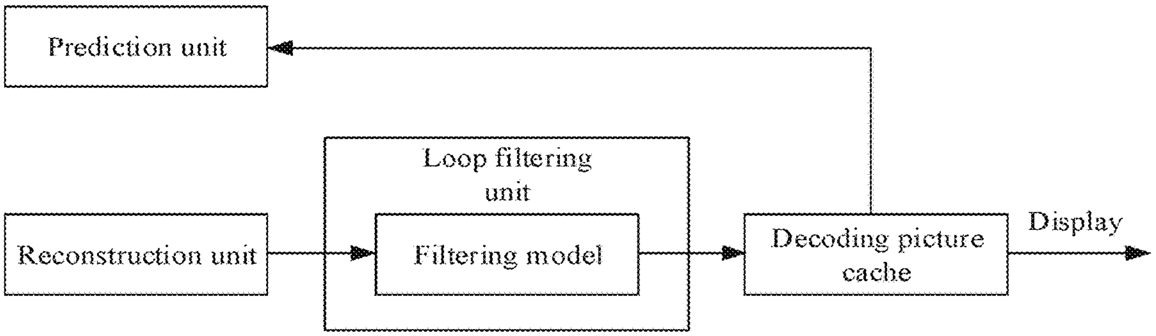
FIG. 5A is a schematic diagram of an application scenario involved in an embodiment of this disclosure.

The application scenario in this embodiment of this disclosure includes but are not limited to the following:

Scenario 1: As shown in FIG. 5A, the to-be-filtered picture is a picture reconstructed by the reconstruction unit. In other words, the loop filtering unit in this embodiment of this disclosure is the filtering model. The reconstruction unit 250 in FIG. 2 inputs the reconstructed picture into the filtering model in the loop filtering unit 260 for filtering, to obtain a filtered picture, and stores the filtered picture in a decoding picture cache. Alternatively, the reconstruction unit 340 in FIG. 3 inputs the reconstructed picture into the filtering model in the loop filtering unit 350 for filtering, to obtain a filtered picture, and stores the filtered picture in a decoding picture cache or displays the filtered picture.

Figure 5B:
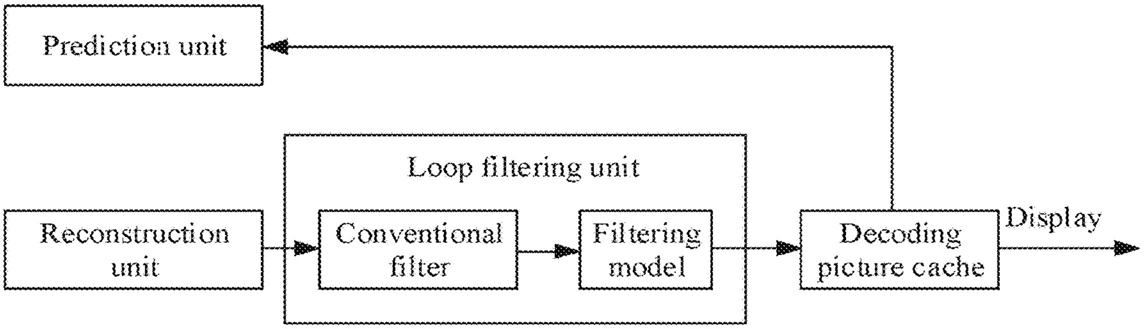
FIG. 5B is a schematic diagram of an application scenario involved in an embodiment of this disclosure.

Scenario 2: As shown in FIG. 5B, the to-be-filtered picture is a picture filtered by at least one of DBF, SAO, and ALF. In other words, the loop filtering unit in this embodiment of this disclosure includes not only a conventional filter, such as at least one of DBF, SAO, and ALF, but also the filtering model. The reconstruction unit 250 in FIG. 2 inputs the reconstructed picture into a conventional filter in the loop filtering unit 260 for filtering, then inputs the filtered picture into the filtering model for filtering, to obtain the filtered picture, and stores the filtered picture in the decoding picture cache. Alternatively, the reconstruction unit 340 in FIG. 3 inputs the reconstructed picture into a conventional filter in the loop filtering unit 350 for filtering, then inputs the filtered picture into the filtering model for filtering, to obtain the filtered picture, and stores the filtered picture in the decoding picture cache or displays the filtered picture.

FIG. 5B only shows an example of using a conventional filter with reference to the filtering model in this embodiment of this disclosure. In some scenarios, a combination manner of the conventional filter and the filtering model in this embodiment of this disclosure includes but is not limited to: first using the filtering model for filtering, then using the conventional filter for filtering, or first using the conventional filter for filtering, then using the filtering model for filtering, and then using the conventional filter for filtering, or other combination manners, which are not limited in this disclosure.

Figure 5C:
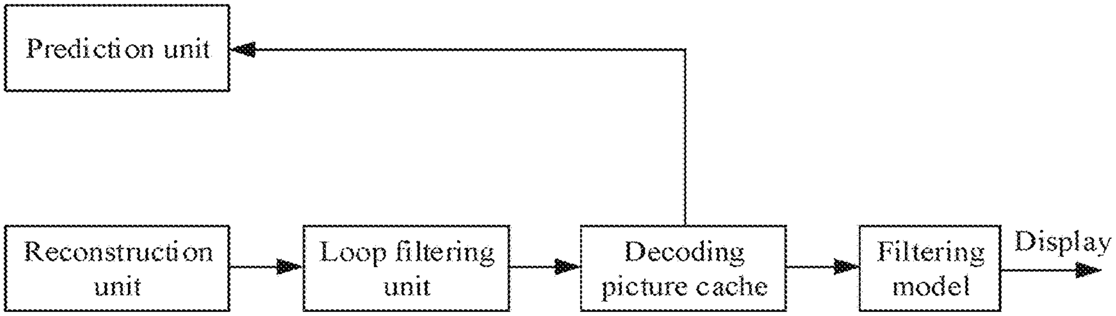
FIG. 5C is a schematic diagram of an application scenario involved in an embodiment of this disclosure.

Scenario 3. As shown in FIG. 5C, the to-be-filtered picture is a to-be-displayed picture. For example, the reconstruction unit 340 in FIG. 3 inputs the reconstructed picture into the loop filtering unit 350 for filtering, and then stores the filtered picture in the decoding picture cache. The picture in the decoding picture cache is used as a reference picture for a subsequent picture for prediction. For example, the prediction unit 320 reads the reference picture from the decoding picture cache for prediction. In addition, the picture in the decoding picture cache is further used for display, but before being used for display, the filtering model in this embodiment of this disclosure is first used for filtering, and the filtered picture is displayed.

As shown in FIG. 5A and FIG. 5B, in some embodiments, the filtered picture in this embodiment of this disclosure is used as a reference picture for a subsequent picture.

As shown in FIG. 5C, in some embodiments, the filtered picture in this embodiment of this disclosure is used for display and is not used as a reference picture for a subsequent picture.

The filtering model in this embodiment of this disclosure is a general filtering model, which may be configured to perform filtering on the intra-frame encoding picture, and may also be configured to perform filtering on the inter-frame encoding picture. However, due to a difference between intra-frame encoding and inter-frame encoding, to improve filtering accuracy, in this embodiment of this disclosure, the to-be-filtered picture is input into the filtering model. The input indicates classification information of an encoding picture type, an encoding mode, and the like of the to-be-filtered picture.

In this embodiment of this disclosure, encoding information of the to-be-filtered picture is not limited, and may be the encoding type information involved in an encoding process of the to-be-filtered picture.

In some embodiments, the encoding information of the to-be-filtered picture includes classification information, and the classification information indicates at least one of an encoding picture type and an encoding mode of the to-be-filtered picture.

The encoding picture type involved in this embodiment of this disclosure includes the full intra-frame encoding picture and the inter-frame encoding picture.

The full intra-frame encoding picture means that an encoding type of the picture is a full intra-frame encoding manner. In other words, reference information for prediction of the full intra-frame encoding picture all comes from spatial domain information of the picture.

The inter-frame encoding picture means that the encoding type of the picture may be an inter-frame encoding manner.

In other words, in a process of predicting the inter-frame encoding picture, refer to time domain reference information of other reference frames.

In some embodiments, classification of the encoding mode includes an overall encoding mode, for example, includes two types: an inter-frame encoding mode and an intra-frame encoding mode.

For the encoder side, the overall encoding mode may be determined according to the prediction mode used by all prediction units corresponding to the to-be-filtered picture. For example, in the encoding process of the to-be-filtered picture, if all prediction units corresponding to the to-be-filtered picture use the intra-frame prediction mode for prediction, it is determined that the overall encoding mode of the to-be-filtered picture is the intra-frame encoding mode. If all the prediction units corresponding to the to-be-filtered picture use the inter-frame prediction mode for prediction, it is determined that the overall encoding mode of the to-be-filtered picture is the inter-frame encoding mode.

For the decoder side, a manner for obtaining the overall encoding mode of the to-be-filtered picture includes at least the following two manners:

Manner 1: A bitstream includes the overall encoding mode of the to-be-filtered picture, so that the decoder side obtains the overall encoding mode of the to-be-filtered picture by decoding the bitstream.

Manner 2: The decoder side determines the overall encoding mode of the to-be-filtered picture based on the prediction mode used by all prediction units corresponding to the to-be-filtered picture. For example, in the decoding process of the to-be-filtered picture, if all prediction units corresponding to the to-be-filtered picture use the intra-frame prediction mode for prediction, it is determined that the overall encoding mode of the to-be-filtered picture is the intra-frame encoding mode. If all the prediction units corresponding to the to-be-filtered picture use the inter-frame prediction mode for prediction, it is determined that the overall encoding mode of the to-be-filtered picture is the inter-frame encoding mode.

In some embodiments, classification of encoding modes may be further specific to encoding sub-modes. The encoding sub-mode may be understood as a specific encoding manner of the to-be-filtered picture, for example, specifically which sub-mode in the intra-frame encoding mode, or specifically which sub-mode in the inter-frame encoding model.

Common intra-frame encoding technologies include: a common intra-frame encoding mode, a matrix weighted intra prediction (MIP) mode, an intra block copy (IBC) technology, an intra string prediction (ISP) technology, a palette (PLT) technology, and the like.

Common inter-frame encoding technologies include: an ordinary inter-frame encoding mode, a motion merge mode (Merge mode), a motion merge and residual skip mode (Skip mode), a combined inter and intra prediction (CIIP) mode, and the like.

For the encoder side, the encoding sub-mode may be determined according to the prediction mode used by all prediction units corresponding to the to-be-filtered picture. For example, in the encoding process of the to-be-filtered picture, if all prediction units corresponding to the to-be-filtered picture use the ordinary intra-frame encoding mode for prediction, it is determined that the encoding sub-mode of the to-be-filtered picture is the ordinary intra-frame encoding mode. If all the prediction units corresponding to the to-be-filtered picture use the merge mode for prediction, it is determined that the encoding sub-mode of the to-be-filtered picture is the merge mode.

For the decoder side, a manner for obtaining the encoding sub-mode of the to-be-filtered picture includes at least the following two manners:

Manner 1: A bitstream includes the encoding sub-mode of the to-be-filtered picture, so that the decoder side obtains the encoding sub-mode of the to-be-filtered picture by decoding the bitstream.

Manner 2: The decoder side determines the encoding sub-mode of the to-be-filtered picture based on the prediction mode used by all prediction units corresponding to the to-be-filtered picture. For example, in the decoding process of the to-be-filtered picture, if all prediction units corresponding to the to-be-filtered picture use the ordinary intra-frame encoding mode for prediction, it is determined that the encoding sub-mode of the to-be-filtered picture is the ordinary intra-frame encoding mode. If all the prediction units corresponding to the to-be-filtered picture use the merge mode for prediction, it is determined that the encoding sub-mode of the to-be-filtered picture is the merge mode.

When filtering is performed in this embodiment of this disclosure, the to-be-filtered picture and classification information indicating at least one of the encoding picture type and the encoding mode of the to-be-filtered picture are input into the filtering model, to obtain a filtered picture of the to-be-filtered picture.

In some embodiments, the classification information of the to-be-filtered picture may be a matrix including a plurality of elements.

In some embodiments, the classification information of the to-be-filtered picture is data of one element.

A process of determining the encoding information of the to-be-filtered picture in this embodiment of this disclosure is introduced in detail below with reference to specific examples.

Case 1. If the classification information indicates the encoding picture type of the to-be-filtered picture, the determining the encoding information of the to-be-filtered picture in S401 includes the following steps:

- S401-A1: Obtain encoding picture types corresponding to a plurality of picture areas in a to-be-filtered picture; and determine, in a case that the plurality of picture areas all belong to a full intra-frame encoding picture, that a value of classification information is a first value;
- S401-A2: Determine, in a case that the plurality of picture areas all belong to an inter-frame encoding picture, that a value of the classification information is a second value; and
- S401-A3: In a case that the to-be-filtered picture crosses a slice boundary or a tile boundary, determine that a value of the classification information is a third value, or determine a classification information according to a proportion of a picture area belonging to the full intra-frame encoding picture among the plurality of picture areas in the to-be-filtered picture and a proportion of a picture area belonging to the inter-frame encoding picture among the plurality of picture areas in the to-be-filtered picture.

Figures 6A, 6B, 6C:
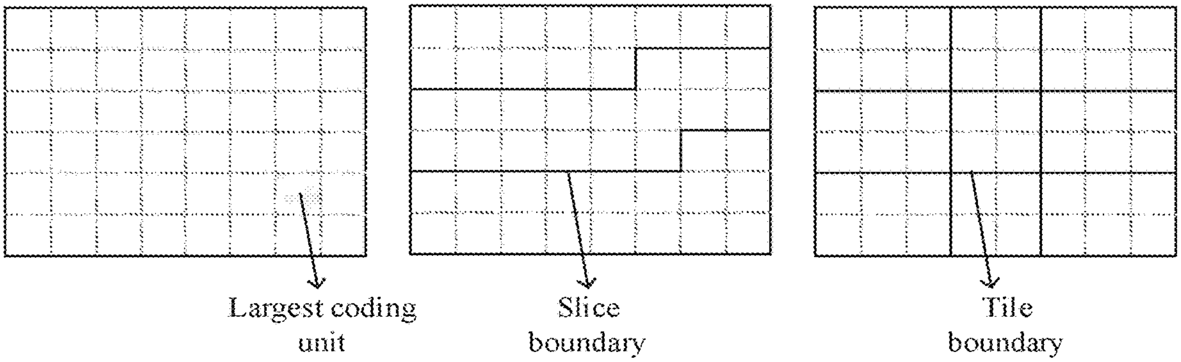
FIG. 6A to FIG. 6C are schematic diagrams of picture division.

Specifically, the encoding pictures in this embodiment of this disclosure are divided into the full intra-frame encoding picture and the inter-frame encoding picture. As shown in FIG. 6A to FIG. 6C, the pictures include a frame, a slice, and a tile. When the classification information represents an encoding picture type, the classification information may be indicated at one of a slice level, a tile level, or a frame header level.

When the filtering model is actually used, generally, a whole frame is not directly input for filtering, but the picture is divided into sub-pictures, and then the sub-pictures are gradually input into the filtering model for filtering. Because sizes of the sub-pictures may be large or small, there are cases that the to-be-filtered picture input into the filtering model may cross a slice/tile boundary. The to-be-filtered picture in this embodiment of this disclosure may be understood as one sub-picture.

Based on this, in this embodiment of this disclosure, the classification information of the to-be-filtered picture is determined based on the encoding picture type of the to-be-filtered picture and whether the to-be-filtered picture crosses the slice boundary or the tile boundary.

A plurality of picture areas in the to-be-filtered picture may be all picture areas in the to-be-filtered picture, or may be a part of picture areas in the to-be-filtered picture, for example, 80% of picture areas in the to-be-filtered picture.

Specifically, if all picture areas in the plurality of picture areas of the to-be-filtered picture belong to the full intra-frame encoding picture, it is determined that a value of the classification information is a first value; and if all the picture areas in the plurality of picture areas of the to-be-filtered picture belong to the inter-frame encoding picture, it is determined that a value of the classification information is a second value.

A specific value of the first value and a specific value of the second value are not limited in this embodiment of this disclosure.

In some embodiments, the first value is 0.

In some embodiments, the second value is 1.

In an example, the classification information in this embodiment of this disclosure is data of one element. For example, if all the picture areas in the plurality of picture areas of the to-be-filtered picture belong to the full intra-frame encoding picture, it is determined that a value of the classification information is 1; and if all the picture areas in the plurality of picture areas of the to-be-filtered picture belong to the inter-frame encoding picture, it is determined that a value of the classification information of the to-be-filtered picture is 0.

In another embodiment, the classification information in this embodiment of this disclosure is a matrix, and the matrix may be consistent with a size of the to-be-filtered picture, or may be inconsistent with a size of the to-be-filtered picture. For example, if the plurality of picture areas of the current to-be-filtered picture all belong to the full intra-frame encoding picture, it is determined that the classification information is a matrix of zeros. If the plurality of picture areas of the current to-be-filtered picture all belong to the inter-frame encoding picture, it is determined that the classification information is a matrix of ones.

If the to-be-filtered picture crosses a slice boundary or a tile boundary, the classification information of the to-be-filtered picture may be determined according to the following two manners.

Manner 1: If the to-be-filtered picture crosses the slice boundary or the tile boundary, it is determined that a value of the classification information is a third value.

A specific value of the third value is not limited in this embodiment of this disclosure, provided that the first value is different from the second value.

In an example, if the classification information is data of one element, for example, if the to-be-filtered picture crosses the slice boundary or the tile boundary, it is determined that a value of the classification information is 2.

In another embodiment, if the classification information is one matrix, for example, if the to-be-filtered picture crosses the slice boundary or the tile boundary, it is determined that the classification information is a matrix of twos.

Manner 2: If the to-be-filtered picture crosses the slice boundary or the tile boundary, the classification information is determined according to a proportion of a picture area belonging to the full intra-frame encoding picture among the plurality of picture areas in the to-be-filtered picture and a proportion of a picture area belonging to the inter-frame encoding picture among the plurality of picture areas in the to-be-filtered picture.

In the manner 2, an implementation of determining the classification information according to the proportion of the picture area belonging to the full intra-frame encoding picture among the plurality of picture areas in the to-be-filtered picture and the proportion of the picture area belonging to the inter-frame encoding picture in the to-be-filtered picture among the plurality of picture areas includes but is not limited to the following examples:

Example 1: It is determined, in a case that the proportion of the picture area belonging to the full intra-frame encoding picture among the plurality of picture areas in the to-be-filtered picture is greater than or equal to a first threshold, that the value of the classification information is the first value; and it is determined, in a case that the proportion of the picture area belonging to the full intra-frame encoding picture among the plurality of picture areas in the to-be-filtered picture is less than the first threshold, that the value of the classification information is the second value.

Example 2: It is determined, in a case that the proportion of the picture area belonging to the full intra-frame encoding picture among the plurality of picture areas in the to-be-filtered picture is greater than or equal to a first threshold, that the value of the classification information is the first value; and it is determined, in a case that the proportion of the picture area belonging to the full intra-frame encoding picture among the plurality of picture areas in the to-be-filtered picture is less than the first threshold and greater than or equal to a second threshold, that the value of the classification information is the second value; and it is determined, in a case that the proportion of the picture area belonging to the full intra-frame encoding picture among the plurality of picture areas in the to-be-filtered picture is less than the second threshold, that the value of the classification information is the third value.

A specific value of the first threshold and a specific value of the second threshold are not limited in this embodiment of this disclosure, and the first threshold is greater than the second threshold.

In some embodiments, the first threshold is greater than 50% and less than 100%.

In the case 1, the classification information indicates the encoding picture type of the to-be-filtered picture. After the classification information is input into the filtering model, the filtering model may perform accurate filtering on the to-be-filtered picture according to the encoding picture type of the to-be-filtered picture.

Case 2: The encoding mode includes an intra-frame encoding mode and an inter-frame encoding mode, and in a case that the classification information indicates the encoding mode of the to-be-filtered picture, the classification information includes at least one of first classification information and second classification information. In this embodiment, the classification information is indicated at a block level.

The first classification information is used for indicating an encoding mode corresponding to one or more pixels in the to-be-filtered picture.

The second classification information is used for indicating an encoding mode corresponding to a preset size area in the to-be-filtered picture.

For the first classification information and the second classification information, in the case 2, it is determined that the encoding information of the to-be-filtered picture includes the following two sub-cases, which are a case 1 and a case 2 respectively. The case 1 is a process of determining the first classification information, and case 2 is a process of determining the second classification information.

Case 1: If the classification information includes the first classification information, the first classification information is a matrix including a plurality of elements, and each element corresponds to an encoding mode of one or more pixels in the to-be-filtered picture, the determining the encoding information of the to-be-filtered picture in S401 includes the following steps:

S401-B: Obtain an encoding mode corresponding to one or more pixels in a to-be-filtered picture, and determine first classification information according to the encoding mode corresponding to the one or more pixels in the to-be-filtered picture.

In the case 1, the first classification information is determined according to the encoding mode corresponding to the one or more pixels in the to-be-filtered picture. For example, if an encoding mode of each pixel in the to-be-filtered picture is the intra-frame encoding mode, it is determined that a value of each matrix element in the first classification information is a first value.

In some embodiments, an implementation of S401-B includes the following examples:

Example 1: It is determined, in a case that an encoding mode corresponding to all pixels in the to-be-filtered picture is the intra-frame encoding mode, that a value of each matrix element in the first classification information is a first value.

Example 2: It is determined, in a case that an encoding mode corresponding to all the pixels in the to-be-filtered picture is the inter-frame encoding mode, that a value of each matrix element in the first classification information is a second value.

Example 3: It is determined, in a case that an encoding mode corresponding to one or more pixels in a first picture area in the to-be-filtered picture is the intra-frame encoding mode, and an encoding mode corresponding to one or more pixels in a second picture area in the to-be-filtered picture is the inter-frame encoding mode, that a value of a matrix element corresponding to the one or more pixels in the first picture area in the first classification information is the first value, and a value of a matrix element corresponding to the one or more pixels in the second picture area is the second value.

A specific value of the first value and a specific value of the second value are not limited in this embodiment of this disclosure.

In some embodiments, the first value is 0.

In some embodiments, the second value is 1.

In a possible implementation, a size of the first classification information is consistent with a size of the to-be-filtered picture. In other words, each matrix element in the first classification information is in a one-to-one correspondence with each pixel in the to-be-filtered picture. In this way, a value of the first classification information may be determined according to an encoding mode corresponding to each pixel in the to-be-filtered picture. For example, if an encoding mode corresponding to each pixel in the to-be-filtered picture is the intra-frame encoding mode, it is determined that a value of each matrix element in the first classification information is a first value (for example, each value is 0). If an encoding mode corresponding to each pixel in the to-be-filtered picture is the inter-frame encoding mode, it is determined that a value of each matrix element in the first classification information is a second value (for example, each value is 1). If an encoding mode corresponding to a first part of pixels in the to-be-filtered picture is the intra-frame encoding mode, and an encoding mode corresponding to a second part of pixels is the inter-frame encoding mode, it is determined that values of matrix elements corresponding to the first part of pixels in the first classification information are all the first value (for example, all values are 0), and values of matrix elements corresponding to the second part of pixels are all the second value.

In another possible implementation, a size of the first classification information is inconsistent with a size of the to-be-filtered picture. For example, the size of the first classification information is less than the size of the to-be-filtered picture. For example, if a size of the to-be-filtered picture is 64×64, a size of the first classification information is 64/nx64/m, where both n and m are positive integers. For example, a size of the first classification information is 32×32, and one matrix element in the first classification information corresponds to four pixels in the to-be-filtered picture. In this way, a value of a corresponding matrix element in the first classification information may be determined according to the encoding modes corresponding to every four pixels in the to-be-filtered picture.

For example, a pixel 1, a pixel 2, a pixel 3, and a pixel 4 in the to-be-filtered picture correspond to a matrix element 1 in the first classification information. If encoding modes corresponding to the pixel 1, the pixel 2, the pixel 3, and the pixel 4 are all the intra-frame encoding modes, it is determined that a value of a matrix element 1 in the first classification information is a first value. If encoding modes corresponding to the pixel 1, the pixel 2, the pixel 3 and the pixel 4 are all the inter-frame encoding modes, it is determined that a value of the matrix element 1 in the first classification information is a second value. If encoding modes corresponding to most of the pixels in the pixel 1, the pixel 2, the pixel 3, and the pixel 4 are the inter-frame encoding modes, it is determined that the value of the matrix element 1 in the first classification information is the second value. If the encoding modes corresponding to most of the pixels in the pixel 1, the pixel 2, the pixel 3, and the pixel 4 are the intra-frame encoding modes, it is determined that the value of the matrix element 1 in the first classification information is the first value.

Case 2: If the classification information includes the second classification information, the determining the encoding information of the to-be-filtered picture in S401 includes the following steps:

S401-C: Determine the second classification information according to a proportion of picture areas corresponding to different encoding modes in the to-be-filtered picture.

In the case 2, the second classification information is determined according to the proportion (or proportion) of the picture areas corresponding to different encoding modes in the to-be-filtered picture. For example, if the picture area corresponding to the intra-frame encoding mode in the to-be-filtered picture is greater than the picture area corresponding to the inter-frame encoding mode, it is determined that the value of the second classification information is the first value.

In some embodiments, an implementation of S401-C includes but is not limited to the following manners:

Manner 1: Determine, in a case that a proportion of a picture area corresponding to the intra-frame encoding mode in the to-be-filtered picture is greater than or equal to a first preset threshold, that a value of the second classification information is a first value; and determine, in a case that the proportion of the picture area corresponding to the intra-frame encoding mode in the to-be-filtered picture is less than the first preset threshold, that a value of the second classification information is a second value.

In some embodiments, the second classification information is a value of one element, for example, 0 or 1. For example, if a proportion of a picture area corresponding to the intra-frame encoding mode in the to-be-filtered picture is greater than or equal to a first preset threshold, it is determined that a value of the second classification information is 0. If the proportion of the picture area corresponding to the intra-frame encoding mode in the to-be-filtered picture is greater than or equal to the first preset threshold, it is determined that the value of the second classification information is 1.

In some embodiments, the second classification information is a matrix. For example, if a proportion of a picture area corresponding to the intra-frame encoding mode in the to-be-filtered picture is greater than or equal to a first preset threshold, it is determined that the second classification information is a matrix of zeros. If the proportion of the picture area corresponding to the intra-frame encoding mode in the to-be-filtered picture is less than the first preset threshold, it is determined that the second classification information is a matrix of ones.

A specific value of the first preset threshold is not limited in this embodiment of this disclosure.

In some embodiments, the first preset threshold is 80%.

For example, if the picture area corresponding to the intra-frame encoding mode in the to-be-filtered picture is greater than or equal to 80% of a size of the to-be-filtered picture, it is determined that the value of the second classification information is 0 (if the second classification information is a matrix, a value of each element in the second classification information is 0). If the picture area corresponding to the intra-frame encoding mode in the to-be-filtered picture is less than 80% of the size of the to-be-filtered picture, it is determined that the value of the second classification information is 1 (if the second classification information is a matrix, a value of each element in the second classification information is 1).

Manner 2: Determine, in a case that a proportion of a picture area corresponding to the intra-frame encoding mode in the to-be-filtered picture is greater than or equal to a first preset threshold, that a value of the second classification information is a first value; and it is determined, in a case that the proportion of the picture area corresponding to the intra-frame encoding mode in the to-be-filtered picture is less than the first preset threshold and greater than or equal to a second preset threshold (the second preset threshold is less than the first preset threshold), that a value of the second classification information is a second value; and it is determined, in a case that the proportion of the picture area corresponding to the intra-frame encoding mode in the to-be-filtered picture is less than the second threshold, that a value of the second classification information is a third value.

A specific value of the first value, a specific value of the second value, and a specific value of the third value are not limited in this embodiment of this disclosure.

In some embodiments, the first value is 0.

In some embodiments, the second value is 1.

In some embodiments, the third value is 2.

A specific value of the first preset threshold and a specific value of the second preset threshold are not limited in this embodiment of this disclosure.

In some embodiments, the first preset threshold is 80%.

In some embodiments, the second preset threshold is 60%.

For example, if the picture area corresponding to the intra-frame encoding mode in the to-be-filtered picture is greater than or equal to 80% of a size of the to-be-filtered picture, it is determined that the value of the second classification information is 0 (if the second classification information is a matrix, a value of each element in the second classification information is 0). If the picture area corresponding to the intra-frame encoding mode in the to-be-filtered picture is less than 80% of the size of the to-be-filtered picture, and is greater than or equal to 60% of the size of the to-be-filtered picture, it is determined that the value of the second classification information is 1 (if the second classification information is a matrix, the value of each element in the second classification information is 1). If the picture area corresponding to the intra-frame encoding mode in the to-be-filtered picture is less than 60% of the size of the to-be-filtered picture, it is determined that the value of the second classification information is 2 (if the second classification information is a matrix, a value of each element in the second classification information is 2).

In the case 2, the classification information indicates an encoding mode of the to-be-filtered picture. The encoding mode may be understood as an overall encoding mode of the to-be-filtered picture, such as the intra-frame encoding mode or the inter-frame encoding mode. After the classification information is input into the filtering model, the filtering model may perform accurate filtering on the to-be-filtered picture according to the encoding mode of the to-be-filtered picture, thereby improving a filtering effect.

Case 3: The encoding mode of the to-be-filtered picture includes: at least one of an ordinary intra-frame encoding mode, an MIP mode, an IBC mode, an ISP mode, a PLT mode, an ordinary inter-frame encoding mode, a skip mode, a merge mode, and a CIIP mode. In this case, if the classification information indicates the encoding mode of the to-be-filtered picture, the classification information is indicated at a block level. If the classification information indicates the encoding mode of the to-be-filtered picture, the determining encoding information of a to-be-filtered picture in S401 includes the following steps:

S401-D: Obtain encoding modes corresponding to a plurality of picture areas in a to-be-filtered picture, and determine classification information according to an encoding mode corresponding to each picture area in the to-be-filtered picture.

In this embodiment of this disclosure, one picture area of the to-be-filtered picture may be one pixel, several consecutive pixels, or one encoding block. In this embodiment of this disclosure, by obtaining encoding modes corresponding to a plurality of picture areas in the to-be-filtered picture, the classification information of the to-be-filtered picture is determined according to the encoding modes corresponding to the plurality of picture areas in the to-be-filtered picture. For example, if the encoding modes corresponding to the plurality of picture areas in the to-be-filtered picture are ordinary intra-frame encoding modes, it is determined that a value of the classification information is a first value.

In some embodiments, the classification information may be determined according to an index of the encoding mode. In other words, S401-D includes the following steps: S401-D1: Determine indices of encoding modes corresponding to a plurality of picture areas in a to-be-filtered picture; and S401-D2: Determine classification information according to the indices of the encoding modes corresponding to the plurality of picture areas in the to-be-filtered picture.

In some embodiments, one encoding mode corresponds to one index, and different index values are respectively preset for an ordinary intra-frame encoding mode, an MIP mode, an IBC mode, an ISP mode, a PLT mode, an ordinary inter-frame encoding mode, a skip mode, a merge mode, and a CIIP mode. Based on this, the classification information may be determined according to the index of the encoding mode corresponding to each picture area in the to-be-filtered picture. For example, if the encoding mode corresponding to each picture area in the to-be-filtered picture is the ordinary intra-frame encoding mode, and an index value of the ordinary intra-frame encoding mode is 0, it may be determined that a value of the classification information is 0 or a matrix of zeros.

In some embodiments, a plurality of encoding modes correspond to one index. For example, an index value of the ordinary intra-frame encoding mode is 0, an index value of the MIP mode, the IBC mode, the ISP mode, and the PLT mode is 1, an index value of the ordinary inter-frame encoding mode is 2, an index value of the skip mode and the merge mode is 3, and an index value of the CIIP mode is 4. Based on this, the classification information may be determined according to the indices of the encoding modes corresponding to the plurality of picture areas in the to-be-filtered picture. For example, an encoding mode corresponding to a first area in the to-be-filtered picture is the skip mode and the merge mode, and an encoding mode corresponding to a second area is the ordinary inter-frame encoding mode. In this way, it may be determined that a value of an element corresponding to the first area in the classification information is 3, and a value of an element corresponding to the second area in indication information in the encoding mode is 2. In this case, the classification information is one matrix.

In the case 1 to the case 3, an encoding picture type and an encoding manner of the to-be-filtered picture being indicated by the classification information are respectively described.

In some embodiments, three matrices may be used for the classification information to indicate the encoding picture type and encoding mode described in the case 1 to the case 3. For example, a matrix A is used for indicating the encoding picture type of the to-be-filtered picture. Specifically, a value of the matrix A is determined according to the description of the case 1. A matrix B is used for indicating whether the encoding mode of the to-be-filtered picture is the intra-frame encoding mode or the inter-frame encoding mode, or coexistence of the intra-frame encoding mode and the inter-frame encoding mode. Specifically, a value of the matrix B is determined according to the description of the case 2. A matrix C is used for indicating the encoding mode specifically used for the to-be-filtered picture, such as which encoding mode is the intra-frame encoding mode or the inter-frame encoding mode. Specifically, a value of the matrix C is determined according to the description of the case 3.

If the classification indication information indicates both the encoding picture type and the encoding mode, the classification information includes at least one of the matrix A, the matrix B, and the matrix C.

For example, if the classification indication information indicates the encoding picture type but not the encoding mode, the classification information may only include the matrix A, and does not include the matrix B and the matrix C.

For example, if the classification indication information does not indicate the encoding picture type but indicates the encoding mode, the classification information does not include the matrix A and includes at least one of the matrix B and the matrix C.

In some embodiments, depending on an actual situation, the matrix may also be data with only one element.

In this embodiment of this disclosure, according to the foregoing method, after the classification information of the to-be-filtered picture is determined, the following step S402 is performed.

S402: Input the to-be-filtered picture and the classification information of the to-be-filtered picture into a same filtering model based on deep learning, to cause the filtering model to perform filtering on the to-be-filtered picture based on the classification information, to obtain a filtered picture. For example, the picture and the classification information indicating at least one of the intra encoding mode or the inter encoding mode is input into a general filtering model trained using deep learning, and a filtered picture is obtained based on the filtering model performing filtering on the picture based on the encoding information.

Figure 7A:
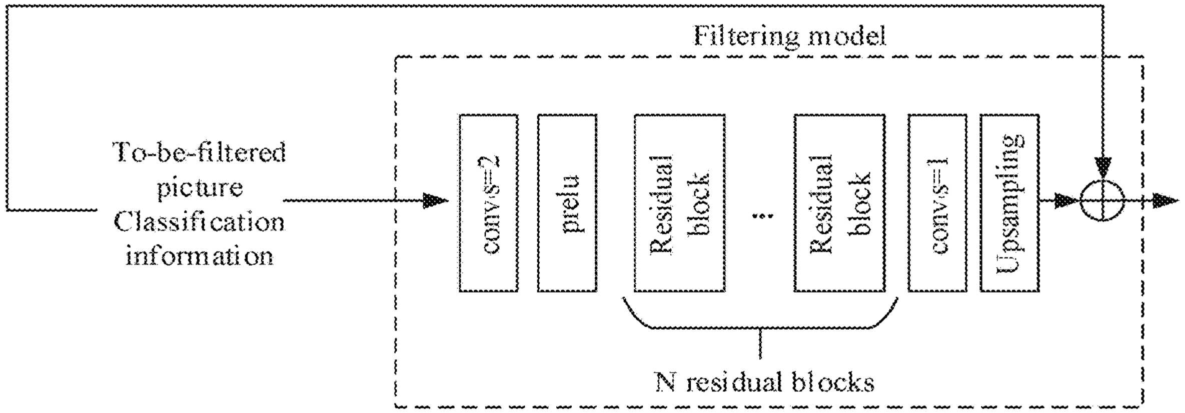
FIG. 7A is a schematic diagram of a filtering scheme involved in an embodiment of this disclosure.

The filtering model in this embodiment of this disclosure is a general model based on deep learning. To improve prediction accuracy of the model, as shown in FIG. 7A, in addition to inputting the to-be-filtered picture into the filtering model, the classification information of the to-be-filtered picture is further input into the filtering model, to be specific, auxiliary information of the encoding type is introduced as an input of the filtering model. This avoids degradation of filtering performance caused by processing a picture with more features (simultaneously processing a picture including the intra-frame encoding mode and the inter-frame encoding mode) by simply using the same filter, and may provide more refined picture information for the picture. In this way, when filtering each picture area of the to-be-filtered picture according to the classification information of the to-be-filtered picture, a filtering effect may be improved.

A specific network structure of the filtering model is not limited in this embodiment of this disclosure, and FIG. 7A is only an example.

In some embodiments, in S402, the inputting the to-be-filtered picture and the classification information of the to-be-filtered picture into a same filtering model based on deep learning includes the following steps: S402-A: Input at least one of the to-be-filtered picture and the classification information that is preprocessed into a filtering model.

Preprocessing example 1: Input the to-be-filtered picture and the classification information on which layer merging is performed into the filtering model.

As an example, the merged layer may be implemented through a concatenation operation of DenseNet. The DenseNet is used for merging channels. As an example of the merged layer, based on grayscale data of the three channels (red, green, and blue) included in the to-be-filtered picture, one classification information channel is newly added to record the classification information, so that the merged to-be-filtered picture includes data of four channels.

Preprocessing example 2: Input the to-be-filtered picture and the classification information that are multiplied into the filtering model.

An example of multiplication may be implemented through dot multiplication. In other words, the grayscale data of the three channels (red, green, and blue) of each pixel of the to-be-filtered picture are multiplied by embedded vector representation of the classification information. The grayscale data of the three channels that is obtained by multiplication is used as an input of the filtering model.

Figure 7B:
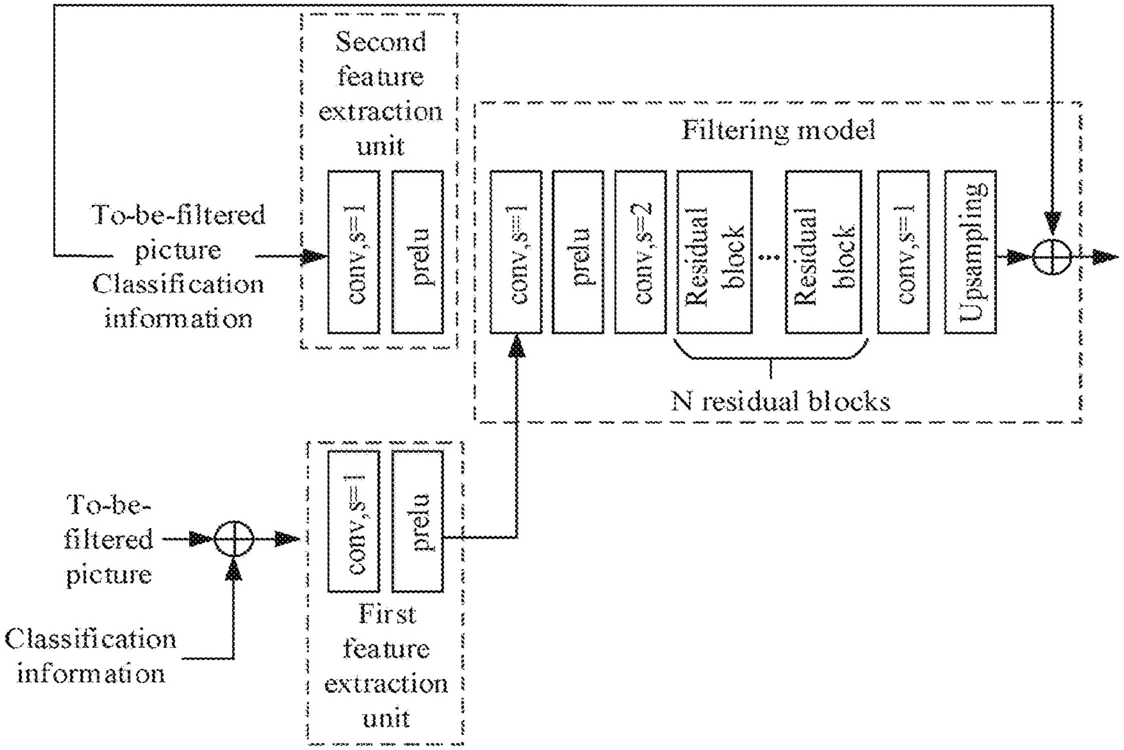
FIG. 7B is a schematic diagram of a filtering scheme involved in an embodiment of this disclosure.

Preprocessing example 3: As shown in FIG. 7B, the to-be-filtered picture and the classification information that are multiplied (such as the dot multiplication) are input into a first feature extraction unit, to obtain first feature information after the to-be-filtered picture is fused with the classification information; the to-be-filtered picture is input into a second feature extraction unit for feature extraction, to obtain second feature information of the to-be-filtered picture; and the first feature information and the second feature information are input into the filtering model, to obtain a filtered picture of the to-be-filtered picture.

A specific network structure of the filtering model is not limited in this embodiment of this disclosure, and FIG. 7B is only an example. A specific network structure of the first feature extraction unit and a specific network structure of the second feature extraction unit are not limited in this embodiment of this disclosure. For example, as shown in FIG. 7B, the first feature extraction unit includes one convolution layer conv (stride S=1) and one activation function (prelu activation function), and the second feature extraction unit also includes one convolution layer (stride S=1) and one activation function (prelu function). In some embodiments, in addition to the prelu activation function shown in FIG. 7B, the activation function may be further an activation function of another type, such as a relu activation function, which is not limited in this embodiment of this disclosure. A structure of the second feature extraction unit may be the same as that of the first feature extraction unit.

In some embodiments, in S402, the inputting the to-be-filtered picture and the classification information of the to-be-filtered picture into a same filtering model based on deep learning includes the following steps: S402-B: Input at least one of a predicted picture, a quantization parameter, and block division information that correspond to the to-be-filtered picture, and the to-be-filtered picture and the classification information into the filtering model. The predicted picture is a predicted picture corresponding to a current to-be-filtered picture, and is formed by stitching prediction blocks.

The block division information is a block division picture corresponding to the current to-be-filtered picture. There are two generation manners: A first manner is to assign different values to a block division boundary and a non-block division boundary; and a second manner is that an area (coding unit) in each block division boundary is filled with a mean value of the to-be-filtered picture in a current area.

The quantization parameter includes at least one of a sequence level quantization parameter and a slice level quantization parameter. The sequence-level quantization parameter is a quantization parameter that acts on a current sequence (all frames, slices, tiles, and the like), and other quantization parameters are obtained by adding an offset based on this. The slice level quantization parameter is a quantization parameter that acts on a current slice.

In an example, at least one of a predicted picture, a quantization parameter, and block division information that correspond to the to-be-filtered picture is fused with the to-be-filtered picture and the classification information and is input into the filtering model, to obtain a filtered picture of the to-be-filtered picture.

In another embodiment, S402-B includes the following steps: S402-B1: Input a predicted picture into a first processing unit, to obtain feature information of the predicted picture; S402-B2: Input a to-be-filtered picture into a second processing unit, to obtain feature information of the to-be-filtered picture; and S402-B3: Input at least one of the feature information of the predicted picture, a quantization parameter, and block division information, and the feature information of the to-be-filtered picture and classification information into a filtering model, to obtain a filtered picture of the to-be-filtered picture.

In this embodiment of this disclosure, first, a predicted picture corresponding to the to-be-filtered picture is input into a first processing unit, to obtain the feature information of the predicted picture; A to-be-filtered picture is input into a second processing unit, to obtain the feature information of the to-be-filtered picture. At least one of the feature information of the predicted picture, the quantization parameter, and the block division information, as shown in FIG. 7C, the feature information of the predicted picture, the quantization parameter, and the feature information and the classification information of the to-be-filtered picture are input into the filtering model, to obtain the filtered picture of the to-be-filtered picture.

A specific network structure of the first processing unit, a specific network structure of the second processing unit, and a specific network structure of the filtering model are not limited in this embodiment of this disclosure. For example, as shown in FIG. 7C, the first processing unit includes one convolution layer and one activation function. For example, as shown in FIG. 7C, the second processing unit includes one convolution layer and one activation function.

Figure 7C:
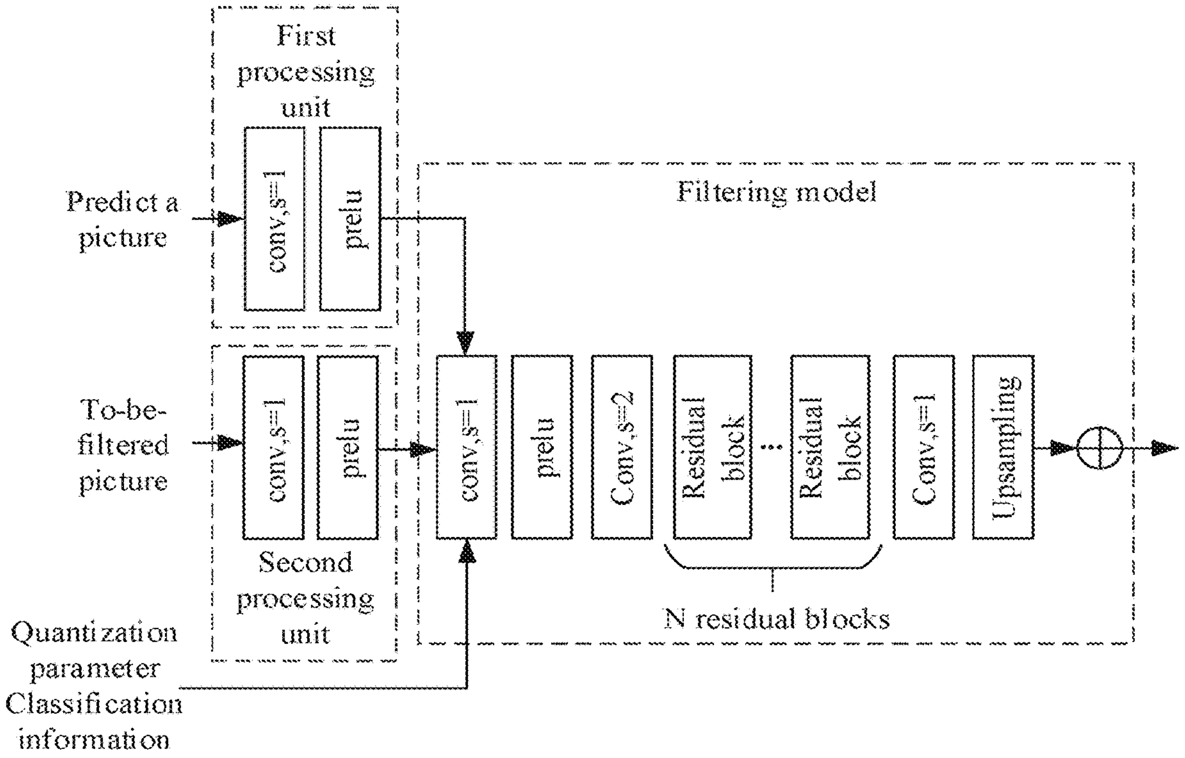
FIG. 7C is a schematic diagram of a filtering scheme involved in an embodiment of this disclosure.

In some embodiments, in addition to the prelu activation function shown in FIG. 7C, the activation function may be further an activation function of another type, which is not limited in this embodiment of this disclosure.

In addition to the structures shown in FIG. 7A to FIG. 7C, a network structure of the filtering model in this embodiment of this disclosure may be further another structure. A specific network structure of the filtering model is not limited in this disclosure.

In some embodiments, at least one of the feature information of the predicted picture, the quantization parameter, and the block division information is fused with the feature information of the to-be-filtered picture and the classification information and is input into the filtering model.

For example, in FIG. 7C, the feature information of the predicted picture, the quantization parameter, and the feature information and the classification information of the to-be-filtered picture may be combined and then input into the filtering model.

In another example, in FIG. 7C, the feature information of the predicted picture, the quantization parameter, and the feature information and the classification information of the to-be-filtered picture may be multiplied and then input into the filtering model.

In some embodiments, referring to FIG. 7A to FIG. 7C, the filtering model in this embodiment of this disclosure includes the network structure of the filtering model and includes the following structures that are sequentially connected: a convolution layer (stride s=1), an activation function (prelu activation function), N residual blocks (N is a positive integer), a convolution layer (stride s=1), and an upsampling layer. Network structures of the N residual blocks may be the same or different.

In some embodiments, a quantity of input channels and a quantity of output channels of each convolution layer included in at least one of the N residual blocks are the same.

Figure 8A:
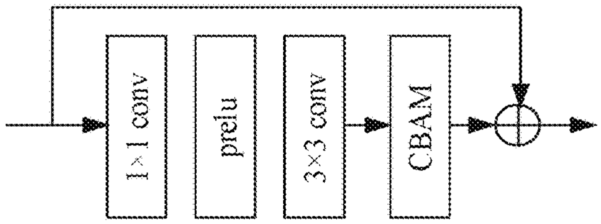
FIG. 8A is a schematic diagram of a residual block involved in an embodiment of this disclosure.

For example, as shown in FIG. 8A, at least one of the N residual blocks includes one 1×1 convolution layer and one 3×3 convolution layer. A quantity of input channels of the 1×1 convolution layer and the 3×3 convolution layer is equal to a quantity of output channels of the 1×1 convolution layer and the 3×3 convolution layer.

Figure 8B:
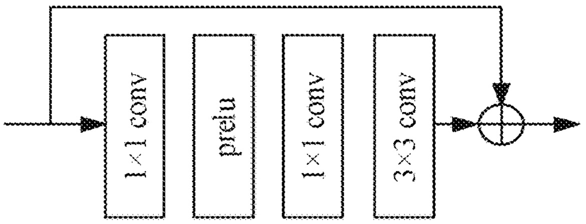
FIG. 8B is a schematic diagram of a residual block involved in an embodiment of this disclosure.

In some embodiments, an attention layer may be added based on the residual block shown in FIG. 8A. For example, as shown in FIG. 8B, a convolutional block attention module (CBAM) is added.

In some embodiments, a quantity of input channels and a quantity of output channels of each convolution layer included in at least one of the N residual blocks are different.

Figure 8C:
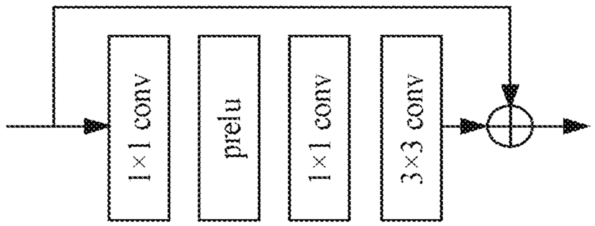
FIG. 8C is a schematic diagram of a residual block involved in an embodiment of this disclosure.

For example, as shown in FIG. 8C, at least one of the N residual blocks includes one 1×1 convolution layer and one 3×3 convolution layer. A quantity of input channels of the 1×1 convolution layer and the 3×3 convolution layer is not equal to a quantity of output channels of the 1×1 convolution layer and the 3×3 convolution layer. For example, it may be set that a quantity of channels is increased before the activation function and a quantity of channels is decreased after the activation function: A quantity of input channels and a quantity of output channels of a first 1×1 convolution layer are 64 and 192 respectively, a quantity of input channels and a quantity of output channels of a second 1×1 convolution layer are 192 and 64 respectively, a quantity of input channels and a quantity of output channels of a third 3×3 convolution layer are 64 and 64 respectively.

Figure 8D:
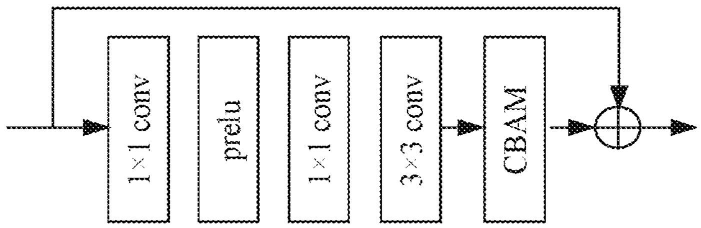
FIG. 8D is a schematic diagram of a residual block involved in an embodiment of this disclosure.

In some embodiments, an attention layer may be added based on the residual block shown in FIG. 8C. For example, as shown in FIG. 8D, a convolutional block attention module (CBAM) is added.

FIG. 7A to FIG. 8D are only schematic diagrams of a network structure of a filtering model involved in this disclosure. The network structure of the filtering model in this embodiment of this disclosure includes but is not limited to that shown in FIG. 7A to FIG. 8D, and specific network parameters shown in FIG. 7A to FIG. 8D are also just an example. This embodiment of this disclosure is not limited thereto.

The filtering model in this embodiment of this disclosure may perform filtering on the to-be-filtered picture in the intra-frame encoding mode, and may also perform filtering on the to-be-filtered picture in the inter-frame encoding mode. This is equivalent to a general filtering model of the to-be-filtered pictures in different modes. Compared with building corresponding filtering models for different modes, in the filtering model in this embodiment of this disclosure, a storage space occupied by model parameters is significantly reduced, and the cost of model parameter storage is low; and the classification information is combined through the filtering model with, and differential filtering is performed on the to-be-filtered picture, which may be applied to to-be-filtered pictures in different modes, thereby improving a filtering effect of the to-be-filtered picture.

The picture filtering method involved in this embodiment of this disclosure is described in detail above. Before performing the picture filtering by using the filtering model, the filtering model needs to be trained first. A training process of the filtering model is described below.

Figure 9:
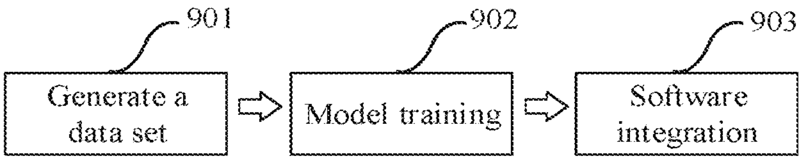
FIG. 9 is a schematic diagram of model training involved in an embodiment of this disclosure.

As shown in FIG. 9, the training process of the filtering model in this embodiment of this disclosure includes the following steps:

Step 901: Generate a data set.

A training set generated by using (encoding and decoding) software.

Training pictures included in the training set include a picture in an intra-frame encoding mode and also include a picture in an inter-frame encoding mode.

In addition, the training set further includes encoding information of each training picture, where the encoding information includes classification information, and the classification information indicates at least one of an encoding picture type and an encoding mode of the training picture.

Step 902: Model training.

A filtering model is trained by using the training set. Specifically, the training pictures and classification information of the training pictures are input into the filtering model to train the filtering model, to obtain a trained filtering model.

In a model training process, a loss function is used. The loss function measures a difference between a predicted value and a real value. The greater the loss value, the greater the difference, and a goal of training is to reduce the loss. The loss functions in this embodiment of this disclosure include: an L1 norm loss function, an L2 norm loss function, and a smooth L1 loss function.

When the filtering model is actually used, generally, a whole frame is not directly input for filtering, but the picture is divided into sub-pictures, and then the sub-pictures are gradually input into the filtering model for filtering. Because sizes of the sub-pictures may be large or small, there are cases that the to-be-filtered picture input into the filtering model may cross a slice/tile boundary.

Based on this, in some embodiments, in addition to inputting the training picture and the classification information of the training picture into the filtering model, at least one of the prediction picture, the quantization parameter, and the block division information corresponding to the training picture may be further input into the filtering model, so that the filtered picture may learn more information about the training picture, thereby improving a filtering effect of the model.

Step 903: Software integration.

The trained filtering model is integrated into the software for filtering. For example, the trained filtering model is integrated into an encoder and/or a decoder, to perform filtering on the reconstructed picture. In this way, a reconstruction effect is improved.

It is to be understood that FIG. 4 to FIG. 9 are only examples in this embodiment of this disclosure, and should not be construed as a limitation to this embodiment of this disclosure.

The exemplary implementations in this embodiment of this disclosure are described above in detail with reference to the accompanying drawings, but this disclosure is not limited to the specific details in the above implementations. Various simple variations may be made to the technical solutions in this embodiment of this disclosure within the scope of the technical idea of this disclosure, and such simple variations shall all fall within the protection scope in this embodiment of this disclosure. For example, the specific technical features described in the above specific embodiments may be combined in any suitable manner without contradiction. To avoid unnecessary repetition, various possible combinations are not further described in this disclosure. In another example, different implementations in this embodiment of this disclosure may also be arbitrarily combined without departing from the idea in this embodiment of this disclosure, and these combinations shall still be regarded as content disclosed in this disclosure.

With reference to FIG. 4 to FIG. 11, the method embodiment in this embodiment of this disclosure is described in detail above, and the apparatus embodiment in this embodiment of this disclosure is described in detail below.

Figure 10:
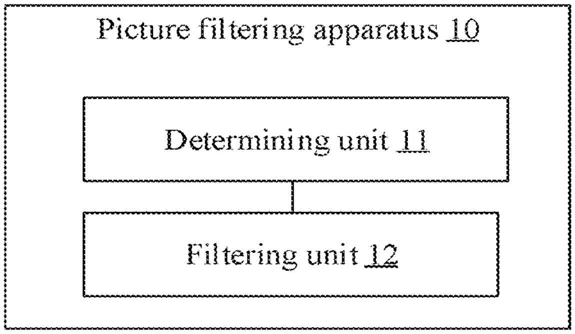
FIG. 10 is a schematic diagram of a structure of a picture filtering apparatus according to an embodiment of this disclosure.

FIG. 10 is a schematic diagram of a structure of a picture filtering apparatus according to an embodiment of this disclosure. The picture filtering apparatus 10 includes: a determining unit 11, configured to determine encoding information of a to-be-filtered picture, the encoding information including classification information of the to-be-filtered picture, and the classification information indicating at least one of an encoding picture type and an encoding mode of the to-be-filtered picture; and a filtering unit 12, configured to input the to-be-filtered picture and the classification information into a same filtering model based on deep learning, to cause the filtering model to perform filtering on the to-be-filtered picture based on the classification information, to obtain a filtered picture.

In some embodiments, the encoding picture type includes a full intra-frame encoding picture and an inter-frame encoding picture, and in a case that the classification information indicates the encoding picture type of the to-be-filtered picture, in some embodiments, the classification information is indicated at a slice level, a picture block level, or a picture header level.

In this case, the determining unit 11 is specifically configured to obtain encoding picture types corresponding to a plurality of picture areas in the to-be-filtered picture; determine, in a case that the plurality of picture areas all belong to the full intra-frame encoding picture, that a value of the classification information is a first value; determine, in a case that the plurality of picture areas all belong to the inter-frame encoding picture, that a value of the classification information is a second value; and in a case that the to-be-filtered picture crosses a slice boundary or a tile boundary, determining that a value of the classification information is a third value, or determining a value of the classification information according to a proportion of a picture area belonging to the full intra-frame encoding picture among the plurality of picture areas in the to-be-filtered picture and a proportion of a picture area belonging to the inter-frame encoding picture among the plurality of picture areas in the to-be-filtered picture.

In some embodiments, the determining unit 11 is specifically configured to determine, in a case that the proportion of the picture area belonging to the full intra-frame encoding picture among the plurality of picture areas in the to-be-filtered picture is greater than or equal to a first threshold, that the value of the classification information is the first value; and determine, in a case that the proportion of the picture area belonging to the full intra-frame encoding picture among the plurality of picture areas in the to-be-filtered picture is less than the first threshold, that the value of the classification information is the second value.

In some embodiments, the determining unit 11 is specifically configured to determine, in a case that the proportion of the picture area belonging to the full intra-frame encoding picture among the plurality of picture areas in the to-be-filtered picture is greater than or equal to a first threshold, that the value of the classification information is the first value; and determine, in a case that the proportion of the picture area belonging to the full intra-frame encoding picture among the plurality of picture areas in the to-be-filtered picture is less than the first threshold and greater than or equal to a second threshold, that the value of the classification information is the second value; and determine, in a case that the proportion of the picture area belonging to the full intra-frame encoding picture among the plurality of picture areas in the to-be-filtered picture is less than the second threshold, that the value of the classification information is the third value.

In some embodiments, the encoding mode includes an intra-frame encoding mode and an inter-frame encoding mode, and in a case that the classification information indicates the encoding mode of the to-be-filtered picture, the classification information includes at least one of first classification information and second classification information, where the first classification information is used for indicating an encoding mode corresponding to one or more pixels in the to-be-filtered picture, and the second classification information is used for indicating an encoding mode corresponding to a preset size area in the to-be-filtered picture. In some embodiments, the classification information is indicated at a block level.

In some embodiments, if the classification information includes the first classification information, the first classification information is a matrix including a plurality of elements, and each element in the matrix corresponds to the encoding mode of the one or more pixels in the to-be-filtered picture, the determining unit 11 is specifically configured to obtain an encoding mode corresponding to one or more pixels in the to-be-filtered picture; and determine the first classification information according to the encoding mode corresponding to the one or more pixels in the to-be-filtered picture.

In some embodiments, the determining unit 11 is specifically configured to determine, in a case that an encoding mode corresponding to all pixels in the to-be-filtered picture is the intra-frame encoding mode, that a value of each matrix element in the first classification information is a first value; determine, in a case that an encoding mode corresponding to all the pixels in the to-be-filtered picture is the inter-frame encoding mode, that a value of each matrix element in the first classification information is a second value; and determine, in a case that an encoding mode corresponding to one or more pixels in a first picture area in the to-be-filtered picture is the intra-frame encoding mode, and an encoding mode corresponding to one or more pixels in a second picture area in the to-be-filtered picture is the inter-frame encoding mode, that a value of a matrix element corresponding to the one or more pixels in the first picture area in the first classification information is the first value, and a value of a matrix element corresponding to the one or more pixels in the second picture area is the second value.

In some embodiments, in a case that the classification information includes the second classification information, the determining unit 11 is specifically configured to determine the second classification information according to a proportion of picture areas corresponding to different encoding modes in the to-be-filtered picture.

In some embodiments, the determining unit 11 is specifically configured to determine, in a case that a proportion of a picture area corresponding to the intra-frame encoding mode in the to-be-filtered picture is greater than or equal to a first preset threshold, that a value of the second classification information is a first value; and determine, in a case that the proportion of the picture area corresponding to the intra-frame encoding mode in the to-be-filtered picture is less than the first preset threshold, that a value of the second classification information is a second value.

In some embodiments, the determining unit 11 is specifically configured to determine, in a case that a proportion of a picture area corresponding to the intra-frame encoding mode in the to-be-filtered picture is greater than or equal to a first preset threshold, that a value of the second classification information is a first value; and determine, in a case that the proportion of the picture area corresponding to the intra-frame encoding mode in the to-be-filtered picture is less than the first preset threshold and greater than or equal to a second preset threshold, that a value of the second classification information is a second value; and determine, in a case that the proportion of the picture area corresponding to the intra-frame encoding mode in the to-be-filtered picture is less than the second threshold, that a value of the second classification information is a third value.

In some embodiments, the encoding mode includes: at least one of a normal intra-frame encoding mode, a matrix weighted intra prediction MIP mode, an intra block copy IBC mode, an intra string prediction ISP mode, a palette PLT mode, a normal inter-frame encoding mode, a skip mode, a motion merge mode, a combined inter and intra prediction CIIP mode; and in a case that the classification information indicates an encoding mode of the to-be-filtered picture, in some embodiments, the classification information is indicated at a block level.

In this case, the determining unit 11 is specifically configured to obtain encoding modes corresponding to a plurality of picture areas in the to-be-filtered picture; and determine the classification information according to the encoding modes corresponding to the plurality of picture areas in the to-be-filtered picture.

In some embodiments, the determining unit 11 is specifically configured to determine indices of the encoding modes corresponding to the plurality of picture areas in the to-be-filtered picture; and determine the classification information according to the indices of the encoding modes corresponding to the plurality of picture areas in the to-be-filtered picture.

In some embodiments, one encoding mode corresponds to one index, or a plurality of encoding modes correspond to one index.

In some embodiments, the filtering unit 12 is specifically configured to input at least one of the to-be-filtered picture and the classification information that is preprocessed into the filtering model.

In some embodiments, the filtering unit 12 is specifically configured to input the to-be-filtered picture and the classification information on which layer merging is performed into the filtering model.

In some embodiments, the filtering unit 12 is specifically configured to input the to-be-filtered picture and the classification information that are multiplied into a first feature extraction unit, to obtain first feature information after the to-be-filtered picture is fused with the classification information; input the to-be-filtered picture into a second feature extraction unit for feature extraction, to obtain second feature information of the to-be-filtered picture; and input the first feature information and the second feature information into the filtering model.

In some embodiments, the filtering unit 12 is specifically configured to input at least one of a predicted picture, a quantization parameter, and block division information that correspond to the to-be-filtered picture, and the to-be-filtered picture and the classification information into the filtering model.

In some embodiments, the filtering unit 12 is specifically configured to input the predicted picture into a first processing unit, to obtain feature information of the predicted picture; input the to-be-filtered picture into a second processing unit, to obtain feature information of the to-be-filtered picture; and input at least one of the feature information of the predicted picture, the quantization parameter, and the block division information, and the feature information of the to-be-filtered picture and the classification information into the filtering model.

In some embodiments, the quantization parameter includes at least one of a sequence level quantization parameter and a slice level quantization parameter.

In some embodiments, the filtering model includes N residual blocks, where N is a positive integer.

In some embodiments, a quantity of input channels and a quantity of output channels of each convolution layer included in at least one of the N residual blocks are the same, or a quantity of input channels and a quantity of output channels of each convolution layer included in at least one of the N residual blocks are different.

In some embodiments, at least one of the N residual blocks includes an attention layer.

In some embodiments, the filtered picture is used as a reference picture for a subsequent picture, or the filtered picture is used for display and is not used as a reference picture for a subsequent picture.

It is to be understood that, the apparatus embodiment and the method embodiment may correspond to each other. For a similar description, reference may be made to the method embodiment. To avoid repetition, details are not described herein again. Specifically, the apparatus 10 shown in FIG. 10 may perform the method embodiment, and each module and other operations and/or functions in the apparatus 16 are respectively intended to implement the method embodiment. For brevity, details are not repeated herein.

The apparatus in the embodiments of this disclosure is described above from the perspective of functional modules with reference to the accompanying drawings. It is to be understood that the functional module may be implemented in the form of hardware, may also be implemented by instructions in the form of software, and may also be implemented by a combination of hardware and software modules. Specifically, each step of the method embodiment in the embodiments of this disclosure may be completed by an integrated logic circuit of hardware in the processor and/or instructions in the form of software. The steps of the method disclosed in the embodiments of this disclosure may be directly embodied as being executed by a hardware decoding processor, or may be performed and completed by using a combination of hardware and software modules in the decoding processor. The software module may be stored in a storage medium that is mature in the art, such as a RAM, a flash memory, a ROM, a programmable ROM, an electrically erasable programmable memory, or a register. The storage medium is located in the memory. The processor reads information in the memory and completes the steps of the method embodiments in combination with hardware thereof.

Figure 11:
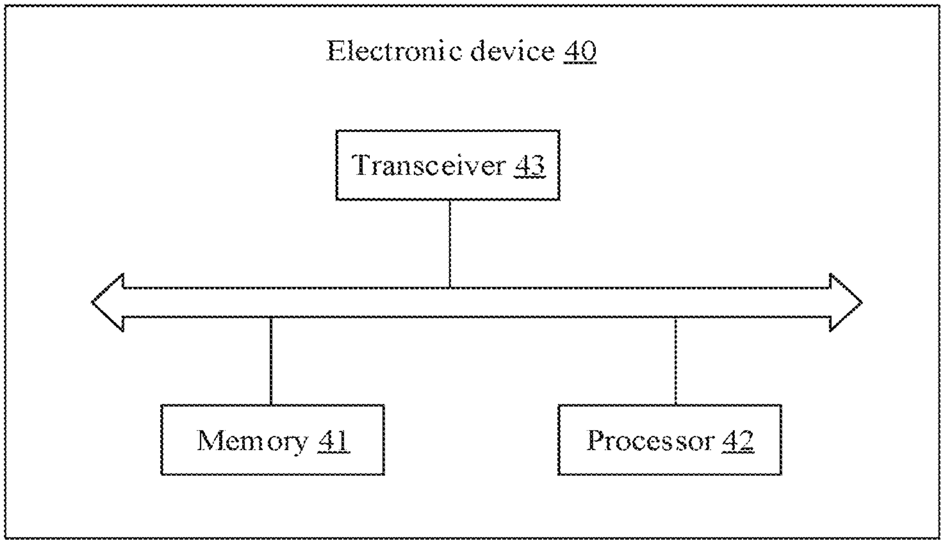
FIG. 11 is a schematic block diagram of an electronic device according to an embodiment of this disclosure.

FIG. 11 is a schematic block diagram of an electronic device according to an embodiment of this disclosure. The electronic device may be the picture filtering apparatus, a video encoder, or a video decoder.

As shown in FIG. 11, the electronic device 40 may include: a memory 41 and memory 42. The memory 41 is configured to store a computer program, and transmit the program code to the memory 42. In other words, the memory 42 may invoke the computer program from the memory 41 and run the computer program, to implement the method in the embodiments of this disclosure. For example, the memory 42 may be configured to perform the method embodiments according to the instruction in the computer program.

In some embodiments of the embodiments of this disclosure, the memory 42 may include, but is not limited to: a general-purpose processor, a digital signal processor (DSP), an application-specific integrated circuit (ASIC), a field programmable gate array (FPGA), or another programmable logical device, discrete gate or transistor logical device, or discrete hardware component.

In some embodiments of the embodiments of this disclosure, the memory 41 includes, but is not limited to, a volatile memory and/or a non-volatile memory. The non-volatile memory may be a read-only memory (ROM), a programmable ROM (PROM), an erasable programmable read-only memory (EPROM), an electrically EPROM (EEPROM), or a flash memory. The volatile memory may be a random access memory (Random Access Memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM).

In some embodiments of the embodiments of this disclosure, the computer program may be divided into one or more modules, and the one or more modules are stored in the memory 41 and executed by the memory 42 to complete the method provided in this embodiment of this disclosure. The one or more modules may be a series of computer program instruction segments capable of accomplishing specific functions, and the instruction segments are used for describing an execution process of the computer program in the video production device.

As shown in FIG. 11, the electronic device 40 may further include: a transceiver 40. The transceiver 43 may be connected to a memory 42 or a memory 41. The processor 42 may control the transceiver 43 to communicate with another device. Specifically, the transceiver 43 transmits information or data to another device, or receives information or data sent by another device. The transceiver 43 may include a transmitter and a receiver. The transceiver 43 may further include an antenna, and a number of the antenna can be one or more.

It is to be understood that various components in the video production device are connected through a bus system, where in addition to a data bus, the bus system further includes a power supply bus, a control bus, and a status signal bus.

This disclosure further provides a computer-readable storage medium, where the computer storage medium stores a computer program, and the computer program, when executed by an electronic device, enables the electronic device to perform the method in the foregoing method embodiments. Alternatively, an embodiment of this disclosure further provides a computer program product including instructions, the instructions, when executed by an electronic device, cause the computer to perform the method in the foregoing method embodiments.

The modules described as separate parts may or may not be physically separate, and parts displayed as modules may or may not be physical modules, may be located in one position, or may be distributed on a plurality of network units. A part or all of the modules may be selected according to actual requirements to achieve the objectives of the solutions of the embodiments of the present disclosure. For example, functional modules in the embodiments in this disclosure may be integrated into one processing module, or each of the modules may exist alone physically, or two or more modules are integrated into one module.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A picture filtering method, comprising:

obtaining encoding modes corresponding to a plurality of picture areas in a picture;

determining encoding information of the picture, the encoding information including classification information that is determined based on at least the encoding modes corresponding to the plurality of picture areas in the picture;

inputting the picture and the classification information into a general filtering model trained using deep learning; and obtaining a filtered picture based on the general filtering model performing filtering on the picture based on the encoding information, wherein the classification information includes at least one of first classification information and second classification information;

the first classification information indicates a first encoding mode corresponding to one or more pixels in the picture; and the second classification information indicates a second encoding mode corresponding to a preset size area in the picture.

2. The method according to claim 1, wherein the classification is determined based on the encoding modes corresponding to the plurality of picture areas in the picture or at least an encoding picture type.

3. The method according to claim 1, further comprising:

obtaining encoding picture types corresponding to the plurality of picture areas in the picture, wherein the determining the encoding information comprises:

when the plurality of picture areas are all coded according to intra-frame encoding, determining that a value of the classification information is a first value;

when the plurality of picture areas are all coded according to inter-frame encoding, determining that a value of the classification information is a second value; and when the picture crosses a slice boundary or a tile boundary, (i) determining that a value of the classification information is a third value, or (ii) determining a value of the classification information according to a proportion of a picture area coded according to the intra-frame encoding among the plurality of picture areas in the picture and a proportion of a picture area coded according to the inter-frame encoding among the plurality of picture areas in the picture.

4. The method according to claim 3, wherein the determining the value of the classification information according to the proportion of the picture area comprises:

when the proportion of the picture area coded according to the intra-frame encoding among the plurality of picture areas in the picture is greater than or equal to a first threshold, determining that the value of the classification information is the first value; and when the proportion of the picture area coded according to the intra-frame encoding among the plurality of picture areas in the picture is less than the first threshold, determining that the value of the classification information is the second value.

5. The method according to claim 3, wherein the determining the value of the classification information according to the proportion of the picture area comprises:

when the proportion of the picture area coded according to the intra-frame encoding among the plurality of picture areas in the picture is greater than or equal to a first threshold, determining that the value of the classification information is the first value;

when the proportion of the picture area coded according to the intra-frame encoding among the plurality of picture areas in the picture is less than the first threshold and greater than or equal to a second threshold, determining that the value of the classification information is the second value; and when the proportion of the picture area coded according to the intra-frame encoding among the plurality of picture areas in the picture is less than the second threshold, determining that the value of the classification information is the third value.

6. The method according to claim 1, wherein the classification information includes the first classification information;

the determining the encoding information of the picture includes determining the first classification information in the encoding information according to the first encoding mode corresponding to the one or more pixels in the picture;

the first classification information is a matrix including a plurality of elements; and each element in the matrix corresponds to the first encoding mode of the one or more pixels in the picture.

7. The method according to claim 6, wherein the determining the first classification information comprises:

when an encoding mode corresponding to all pixels in the picture is intra-frame encoding, determining that a value of each matrix element in the first classification information is a first value;

when an encoding mode corresponding to all the pixels in the picture is inter-frame encoding, determining that a value of each matrix element in the first classification information is a second value; and when an encoding mode corresponding to one or more pixels in a first picture area in the picture is the intra-frame encoding, and an encoding mode corresponding to one or more pixels in a second picture area in the picture is the inter-frame encoding, determining that a value of a matrix element corresponding to the one or more pixels in the first picture area in the first classification information is the first value, and a value of a matrix element corresponding to the one or more pixels in the second picture area is the second value.

8. The method according to claim 1, wherein the classification information includes the second classification information, and the determining the encoding information of the picture includes determining the second classification information according to a proportion of picture areas corresponding to different encoding modes in the picture.

9. The method according to claim 8, wherein the determining the second classification information according to the proportion of picture areas comprises:

when a proportion of a picture area corresponding to intra-frame encoding in the picture is greater than or equal to a first preset threshold, determining that a value of the second classification information is a first value; and when the proportion of the picture area corresponding to the intra-frame encoding in the picture is less than the first preset threshold, determining that a value of the second classification information is a second value.

10. The method according to claim 8, wherein the determining the second classification information according to the proportion of picture areas comprises:

when a proportion of a picture area corresponding to intra-frame encoding in the picture is greater than or equal to a first preset threshold, determining that a value of the second classification information is a first value;

when the proportion of the picture area corresponding to the intra-frame encoding in the picture is less than the first preset threshold and greater than or equal to a second preset threshold, determining that a value of the second classification information is a second value; and when the proportion of the picture area corresponding to the intra-frame encoding in the picture is less than the second threshold, determining that a value of the second classification information is a third value.

11. The method according to claim 1, wherein the encoding modes include at least one of a normal intra-frame encoding mode, a matrix weighted intra prediction MIP mode, an intra block copy IBC mode, an intra string prediction ISP mode, a palette PLT mode, a normal inter-frame encoding mode, a skip mode, a motion merge mode, or a combined inter and intra prediction CIIP mode; and the determining the encoding information of the picture comprises:

obtaining the encoding modes corresponding to the plurality of picture areas in the picture; and determining the classification information in the encoding information according to the encoding modes corresponding to the plurality of picture areas in the picture.

12. The method according to claim 1, further comprising:

determining indices of the encoding modes corresponding to the plurality of picture areas in the picture; and determining the classification information based on at least the indices of the encoding modes corresponding to the plurality of picture areas in the picture.

13. The method according to claim 12, wherein one encoding mode corresponds to one index, or a plurality of encoding modes correspond to one index.

14. The method according to claim 1, wherein the classification information is indicated at a block level.

15. The method according to claim 1, wherein the inputting the picture and the classification information into the general filtering model comprises:

preprocessing the picture and the classification information; and inputting a result of the preprocessing into the general filtering model.

16. The method according to claim 15, wherein the inputting the result of the preprocessing into the general filtering model comprises:

inputting the picture and the classification information on which layer merging has been performed into the general filtering model.

17. The method according to claim 15, wherein the preprocessing and the inputting the result of the preprocessing into the general filtering model comprises:

fusing the picture and the classification information and inputting a result of the fusing into a first feature extraction unit, to obtain first feature information;

inputting the picture into a second feature extraction unit for feature extraction, to obtain second feature information of the picture; and inputting the first feature information and the second feature information into the general filtering model.

18. An image processing apparatus, comprising:

processing circuitry configured to:

obtain encoding modes corresponding to a plurality of picture areas in a picture;

determine encoding information of the picture, the encoding information including classification information that is determined based on at least the encoding modes corresponding to the plurality of picture areas in the picture;

input the picture and the classification information into a general filtering model trained using deep learning; and obtain a filtered picture based on the general filtering model performing filtering on the picture based on the encoding information, wherein the classification information includes at least one of first classification information and second classification information;

the first classification information indicates a first encoding mode corresponding to one or more pixels in the picture; and the second classification information indicates a second encoding mode corresponding to a preset size area in the picture.

19. A non-transitory computer-readable storage medium storing instructions which when executed by at least one processor cause the at least one processor to perform:

obtaining encoding modes corresponding to a plurality of picture areas in a picture;

determining encoding information of the picture, the encoding information including classification information that is determined based on at least the encoding modes corresponding to the plurality of picture areas in the picture;

inputting the picture and the classification information into a general filtering model trained using deep learning; and obtaining a filtered picture based on the general filtering model performing filtering on the picture based on the encoding information, wherein the classification information includes at least one of first classification information and second classification information;

the first classification information indicates a first encoding mode corresponding to one or more pixels in the picture; and the second classification information indicates a second encoding mode corresponding to a preset size area in the picture.

* * * * *